US009959420B2

(12) United States Patent
Kiang et al.

(10) Patent No.: US 9,959,420 B2
(45) Date of Patent: May 1, 2018

(54) SYSTEM AND METHOD FOR ENHANCED SECURITY AND MANAGEMENT MECHANISMS FOR ENTERPRISE ADMINISTRATORS IN A CLOUD-BASED ENVIRONMENT

(71) Applicant: Box, Inc., Los Altos, CA (US)

(72) Inventors: Andy Kiang, Mountain View, CA (US); David Lee, Los Altos, CA (US)

(73) Assignee: Box, Inc., Redwood City, CA (US)

( * ) Notice: Subject to any disclaimer, the term of this patent is extended or adjusted under 35 U.S.C. 154(b) by 0 days. days.

(21) Appl. No.: 14/044,261

(22) Filed: Oct. 2, 2013

(65) Prior Publication Data

US 2014/0259190 A1     Sep. 11, 2014

Related U.S. Application Data

(60) Provisional application No. 61/708,926, filed on Oct. 2, 2012, provisional application No. 61/709,086, filed on Oct. 2, 2012.

(51) Int. Cl.
*G06F 21/62*     (2013.01)
*G06F 21/43*     (2013.01)
(Continued)

(52) U.S. Cl.
CPC .......... *G06F 21/6218* (2013.01); *G06F 21/43* (2013.01); *G06F 21/51* (2013.01); *G06F 21/552* (2013.01)

(58) Field of Classification Search
CPC ........ G06F 21/51; G06F 21/552; G06F 21/43; G06F 9/541; G06F 21/6218
See application file for complete search history.

(56) References Cited

U.S. PATENT DOCUMENTS 858,619 A     7/1907   O'Farrell
4,588,991 A   5/1986   Atalla
(Continued)

FOREIGN PATENT DOCUMENTS

CA     2724521        11/2009
CN     101997924 A    3/2011
(Continued)

OTHER PUBLICATIONS

Mogull; DLP Content Discovery: Best Practices for Stored Data Discovery and Protection; 2009; Retrieved from the Internet <URL: http://eval.symantec.com/mktginfo/enterprise/white_papers/bwhitepaper_dlp_content_discovery_best_practices_01_2009.en-us.pdf>; pp. 1-16.*

(Continued)

*Primary Examiner* — Oleg Korsak
(74) *Attorney, Agent, or Firm* — Perkins Coie LLP

(57) ABSTRACT

A cloud-based platform (e.g., cloud-based collaboration and/or storage platform/service) is described that provides administrators with better visibility into content and activity across an enterprise account via advanced search tools and activity reports. Administrator tools are also provided that allow for actively managing content and passively monitoring content with real-time alerts sent to the administrator if usage of the cloud-based platform changes within the enterprise account. A reporting API is also supported by the cloud-based platform to permit the platform's activity logs to be retrieved by a third-party platform. Additionally, administrators are provided with the option to select two-step login verification of enterprise account users.

28 Claims, 21 Drawing Sheets

(51) Int. Cl.
*G06F 21/51* (2013.01)
*G06F 21/55* (2013.01)

(56) References Cited

U.S. PATENT DOCUMENTS

| | | | |
|---|---|---|---|
| 5,481,610 A | 1/1996 | Doiron et al. |
| 5,604,800 A | 2/1997 | Johnson et al. |
| 5,748,735 A | 5/1998 | Ganesan |
| 5,787,175 A | 7/1998 | Carter |
| 5,799,320 A | 8/1998 | Klug |
| 5,848,415 A | 12/1998 | Guck |
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Sales et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,231,516 B1 | 6/2007 | Sparrell et al. |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,224,934 B1 | 7/2012 | Dongre et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,620,578 B1 | 12/2013 | Brown et al. |
| 8,650,498 B1 | 2/2014 | Mihovilovic |
| 8,719,445 B2 | 5/2014 | Ko |
| 8,745,267 B2 | 6/2014 | Luecke et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,966,062 B1 | 2/2015 | Giese et al. |
| 8,990,955 B2 | 3/2015 | Hymel et al. |
| 9,019,123 B2 | 4/2015 | Boulanger et al. |
| 9,021,099 B2 | 4/2015 | Ko |
| 9,027,108 B2 | 5/2015 | Tan et al. |
| 9,037,870 B1 | 5/2015 | Zheng et al. |
| 9,054,919 B2 | 6/2015 | Kiang et al. |
| 9,117,087 B2 | 8/2015 | Tan et al. |
| 9,135,462 B2 | 9/2015 | Scharf et al. |
| 9,195,519 B2 | 11/2015 | Tan et al. |
| 9,280,613 B2 | 3/2016 | Smith et al. |
| 9,413,587 B2 | 8/2016 | Smith et al. |
| 9,450,926 B2 | 9/2016 | Scharf et al. |
| 9,552,444 B2 | 1/2017 | Smith et al. |
| 9,691,051 B2 | 6/2017 | Rexer et al. |
| 2001/0027492 A1 | 10/2001 | Gupta |
| 2002/0029218 A1 | 3/2002 | Bentley et al. |
| 2002/0062218 A1 | 5/2002 | Pianin |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |

(56) References Cited

U.S. PATENT DOCUMENTS

| | | |
|---|---|---|
| 2003/0041095 A1 | 2/2003 | Konda et al. |
| 2003/0046572 A1 | 3/2003 | Newman et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Ellen et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0239447 A1 | 10/2005 | Holzman et al. |
| 2005/0261933 A1 | 11/2005 | Magnuson |
| 2005/0283800 A1 | 12/2005 | Ellis et al. |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0093150 A1 | 5/2006 | Reddy et al. |
| 2006/0095526 A1 | 5/2006 | Levergood et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011261 A1 | 1/2007 | Madams et al. |
| 2007/0016680 A1 | 1/2007 | Burd et al. |
| 2007/0038934 A1 | 2/2007 | Fellman |
| 2007/0050635 A1 | 3/2007 | Popp |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0192630 A1* | 8/2007 | Crane ............... G06F 21/6245 713/193 |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |

(56) References Cited

U.S. PATENT DOCUMENTS

| | | |
|---|---|---|
| 2009/0164438 A1 | 6/2009 | Delacruz |
| 2009/0171983 A1 | 7/2009 | Samji et al. |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0306547 A1 | 12/2010 | Fallows et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0154180 A1 | 6/2011 | Evanitsky et al. |
| 2011/0154231 A1 | 6/2011 | Cherdron et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0197156 A1 | 8/2011 | Strait et al. |
| 2011/0202424 A1 | 8/2011 | Chun et al. |
| 2011/0202599 A1 | 8/2011 | Yuan et al. |
| 2011/0207436 A1 | 8/2011 | van Gent et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |

(56) References Cited

U.S. PATENT DOCUMENTS

| | | |
|---|---|---|
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007074 A1 | 1/2013 | Weicher |
| 2013/0007245 A1 | 1/2013 | Malik et al. |
| 2013/0007464 A1 | 1/2013 | Madden |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0159707 A1 | 6/2013 | Jogand-Coulomb et al. |
| 2013/0163289 A1 | 6/2013 | Kim et al. |
| 2013/0167253 A1 | 6/2013 | Seleznev et al. |
| 2013/0173916 A1 | 7/2013 | Sato |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198474 A1 | 8/2013 | Shaath |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0311894 A1 | 11/2013 | Rexer et al. |
| 2013/0318586 A1 | 11/2013 | Smith et al. |
| 2013/0326344 A1 | 12/2013 | Masselle et al. |
| 2013/0347070 A1 | 12/2013 | Cairns et al. |
| 2014/0007205 A1 | 1/2014 | Oikonomou |
| 2014/0013104 A1 | 1/2014 | Vinnik et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082091 A1 | 3/2014 | Rexer |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0270178 A1 | 9/2014 | Kiang et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0200948 A1 | 7/2015 | Cairns et al. |
| 2015/0381587 A1 | 12/2015 | Scharf et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |

(56) References Cited

FOREIGN PATENT DOCUMENTS

| WO | WO-2013013217 A1 | 1/2013 |
|---|---|---|
| WO | WO-2013041763 A1 | 3/2013 |
| WO | WO-2013166520 A1 | 11/2013 |

OTHER PUBLICATIONS

No stated author; CheckPoint Virtual Appliance for Amazon Web Services; Jan. 2012; Retrieved from the Internet <URL: web.archive.org/web/20120119235533/http://www.checkpoint.com/products/virtual-appliance-for-amazon-web-services/>; pp. 1-6.*
No stated author; Amazon S3 FAQs; 2012; Retrieved from the Internet <URL: web.archive.org/web/20120615092600/http://aws.amazon.com/s3/faqs/>; pp. 1-14 as printed.*
Wei et al. (Managing Security of Virtual Machine Images in a Cloud Environment, CCSW'09, Nov. 13, 2009, pp. 91-96).*
Oberheide et al. (CloudAV: N-Version Antivirus in the Network Cloud, USENIX08, Jul. 2008, 16 pages).*
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. dated Nov. 21, 2013, 7 pages.
Exam Report for GB1309209.3, Applicant: Box, Inc. dated Oct. 30, 2013, 11 pages.
Exam Report for GB1311417.8, Applicant: Box, Inc. dated Dec. 20, 2013, 5 pages.
Exam Report for GB1312095.1, Applicant: Box, Inc. dated Dec. 12, 2013, 7 pages.
Exam Report for GB1312874.9, Applicant: Box, Inc. dated Dec. 20, 2013, 11 pages.
Exam Report for GB1316532.9, Applicant: Box, Inc. dated Oct. 31, 2013, 10 pages.
Exam Report for GB1316533.7, Applicant: Box, Inc. dated Oct. 8, 2013, 9 pages.
Exam Report for GB1316971.9, Applicant: Box, Inc. dated Nov. 26, 2013, 10 pages.
Exam Report for GB1317600.3, Applicant: Box, Inc. dated Nov. 21, 2013, 8 pages.
Exam Report for GB1318373.6, Applicant: Box, Inc. dated Dec. 17, 2013, 4 pages.
Exam Report for GB1320902.8, Applicant: Box, Inc. dated Dec. 20, 2013, 4 pages.
Gedymin, "Cloud computing with an emphasis on Google App Engine," Master Final Project, Sep. 2011, 146 pages.
Patent Court Document of Approved Judgment for GB0602349.3 and GB0623571.7; Mar. 3, 2009, 17 pages.
Extended Search Report for EP131832800, Applicant: Box, Inc. dated Aug. 25, 2014, 7 pages.
Extended Search Report for EP141509422, Applicant: Box, Inc. dated Aug. 26, 2014, 12pages.
Search Report for EP 13189144.2 Applicant: Box, Inc. dated Sep. 1, 2014, 9 pages.
Exam Report for GB1312874.9 Applicant: Box, Inc. dated Sep. 26, 2014, 2 pages.
Exam Report for GB1415126.0 Applicant: Box, Inc. dated Oct. 2, 2014, 8 pages.
Exam Report for GB1415314.2 Applicant: Box, Inc. dated Oct. 7, 2014, 6 pages.
Exam Report for GB1309209.3 Applicant: Box, Inc. dated Oct. 7, 2014, 3 pages.
Exam Report for GB1315232.7 Applicant: Box, Inc. dated Oct. 9, 2014, 5 pages.
Exam Report for GB1318789.3 Applicant: Box, Inc. dated Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. dated Nov. 7, 2014, 6 pages.
Exam Report for GB1311417.8 Applicant: Box, Inc. dated Nov. 7, 2014, 2 pages.
Exam Report for GB1311421.0 Applicant: Box, Inc. dated Nov. 7, 2014, 4 pages.
Exam Report for GB1316682.2 Applicant: Box, Inc. dated Nov. 19, 2014, 6 pages.
Exam Report for GB1312095.1 Applicant: Box, Inc. dated Nov. 19, 2014, 5 pages.
Exam Report for GB1313559.5 Applicant: Box, Inc. dated Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
"Average Conversion Time for a D60 RAW file?" http://www.dpreview.com, Jul. 22, 2002, 4 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Burns, "Developing Secure Mobile Applications for Android," Oct. 2008, Version 1.0, 1-28 pages.
Cohen, "Debating the Definition of Cloud Computing Platforms," retrieved from the internet, http://forbes.com, Feb. 3, 2014, 7 pages.
Comes, "MediaXchange User's Manual," Version 1.15.15, Feb. 1, 2009, pp. 1-90.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. dated May 26, 2014, 6 pages.
Exam Report for EP13185269.1, Applicant: Box, Inc. dated Jan. 28, 7 pages.
Exam Report for GB1308842.2, Applicant: Box, Inc. dated Mar. 10, 2014, 4 pages.
Exam Report for GB1312264.3, Applicant: Box, Inc. dated Mar. 24, 2014, 7 pages.
Exam Report for GB1314771.5, Applicant: Box, Inc. dated Feb. 17, 2014, 7 pages.
Exam Report for GB1318792.7, Applicant: Box, Inc. dated May 22, 2014, 2 pages.
International Search Report and Written Opinion for PCT/US2013/034765, Applicant: Box, Inc., dated Jan. 20, 2014, 15 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. dated May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.

(56) References Cited

OTHER PUBLICATIONS

Search Report for EP 11729851.3, Applicant: Box, Inc. dated Feb. 7, 2014, 9 pages.
Search Report for EP13187217.8, Applicant: Box, Inc. dated Apr. 15, 2014, 12 pages.
Search Report for EP141509422, Applicant: Box, Inc. dated May 8, 2014, 7 pages.
Search Report for EP14151588.2, Applicant: Box, Inc. dated Apr. 15, 2014, 12 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. dated Jun. 4, 2013, 8 pages.
Exam Report for 081300188.8, Applicant: Box, Inc. dated May 31, 2013, 8 pages.
Exam Report for GB1306011.6, Applicant: Box, Inc. dated Apr. 18, 2013, 8 pages.
Exam Report for GB1310666.1, Applicant: Box, Inc. dated Aug. 30, 2013, 10 pages.
Exam Report for GB1313559.5, Applicant: Box, Inc., dated Aug. 22, 2013, 19 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/039126 dated Oct. 6, 2011, pp. 1-13.
International Search Report and Written Opinion for PCT/US2011/041308 dated Jul. 2, 2012, pp. 1-16.
International Search Report and Written Opinion for PCT/US2011/047530, Applicant: Box, Inc., dated Mar. 22, 2013. pp. 1-10.
International Search Report and Written Opinion for PCT/US2011/056472 dated Jun. 22 2012, pp. 1-12.
International Search Report and Written Opinion for PCT/US2011/057938, Applicant: Box, Inc., dated Mar. 29, 2013, 10 pages.
International Search Report and Written Opinion for PCT/US2011/060875 dated Oct. 30. 2012, pp. 1-10.
International Search Report and Written Opinion for PCT/US2012/056955, Applicant: Box, Inc., dated Mar. 27, 2013, pp. 1-11.
International Search Report and Written Opinion for PCT/US2012/063041, Applicant: Box, Inc., dated Mar. 29, 2013, 12 pages.
International Search Report and Written Opinion for PCT/U32012/065617, Applicant: Box, Inc., dated Mar. 29, 2013, 9 pages.
International Search Report and Written Opinion for PCT/US2012/067126, Applicant: Box, Inc., dated Mar. 29, 2013, 10 pages.
International Search Report and Written Opinion for PCT/US2012/070366, Applicant: Box, Inc., dated Apr. 24, 2013, 10 pages.
International Search Report and Written Opinion for PCT/US2013/020267, Applicant: Box, Inc., dated May 7, 2013, 10 pages.

International Search Report and Written Opinion for PCT/US2013/023889, Applicant: Box, Inc., dated Jun. 24. 2013, 13 pages.
International Search Report and Written Opinion for PCT/US2013/029520, Applicant: Box, Inc. dated Jun. 26, 2013, 10 pages.
International Search Report and Written Opinion for PCT/US2013/034662, Applicant: Box, Inc., dated May 31, 2013, 10 pages.
International Search Report and Written Opinion for PCT/US2013/035404, Applicant: Box, Inc., dated Jun. 26, 2013, 13 pages.
International Search Report and Written Opinion for PCT/US2013/039782, Applicant: Box, Inc., dated Aug. 28, 2013, 15 pages.
Internet Forums, http://web.archive.org/web/20100528195550/http://en.wikipedia.org/wiki/lnternet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for improving your project Management and Team Collaboration," Apr. 31. 2010, tripwiremagazine.com, pp. 1-32.
Palmer, "Load Balancing FTP Servers," BlogNav, Oct. 2008, 2 pages.
Parr. "Googie Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Exam Report for GB1410569.6 Applicant: Box, Inc. dated Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1309209.3 Applicant: Box, Inc. dated Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Burney, "How to Move Document from Your Computer to Your iPad and Back Again," May 31, 2011, 3 pages.
U.S. Appl. No. 61/649,869, filed Mar. 12, 2012, Selective Application Access Control Via a Cloud-Based Service for Security Enhancement.
U.S. Appl. No. 13/493,783, filed Jun. 11, 2012, Security Enhancement Through Application Access Control.
U.S. Appl. No. 61/641,821, filed May 2, 2012, Platform and Application Agnostic Method for Seamless File Access in a Mobile Environment.
U.S. Appl. No. 61/650,840, filed May 23, 2012, Platform and Application Agnostic Method for Seamless File Access in a Mobile Environment.
U.S. Appl. No. 61/653,876, filed May 31, 2012, Platform and Application Agnostic Method for Seamless File Access in a Mobile Environment.
U.S. Appl. No. 13/886,147, filed May 2, 2013, System and Method for a Third-Party Application to Access Content Within a Cloud-Based Platform.
U.S. Appl. No. 13/897,427, filed May 19, 2013, Methods, Architectures and Security Mechanisms for a Third-Party Application to Access Content in a Cloud-Based Platform.
U.S. Appl. No. 13/898,200, filed May 20, 2013, Metadata Enabled Third-Party Application Access of Content at a Cloud-Based Platform via a Native Client to The Cloud-Based Platform.

(56) References Cited

OTHER PUBLICATIONS

U.S. Appl. No. 13/898,242, filed May 20, 2013, Identification Verification Mechanisms for a Third-Party Application to Access Content in a Cloud-Based Platform.
U.S. Appl. No. 13/937,124, filed Jul. 8, 2013, System and Methods for Securely Submitting Comments Among Users via External Messaging Applications in a Cloud-Based Platform.
U.S. Appl. No. 61/694,492, filed Aug. 29, 2012, Method of Streaming File Encryption and Decryption To/From a Collaborative Cloud.
U.S. Appl. No. 13/975,582, filed Aug. 26, 2013, Method of Streaming File Encryption and Decryption To/From a Collaborative Cloud.
U.S. Appl. No. 61/697,437, filed Sep. 6, 2012, Secure File Portability Between Mobile Applications Using a Server-Based Key Generation Service.
U.S. Appl. No. 13/776,358, filed Feb. 25, 2013, Secure File Portability Between Mobile Applications Using a Server-Based Key Generation Service.
U.S. Appl. No. 14/642,131, filed Mar. 9, 2015, Systems and Methods for Secure File Portability Between Mobile Applications on a Mobile Device.
U.S. Appl. No. 61/697,477, filed Sep. 6, 2012, Disabling then Self-Referential Appearance of a Mobile Application in an Intent via a Background Registration.
U.S. Appl. No. 13/794,401, filed Mar. 11, 2013, Disabling the Self-Referential Appearance of a Mobile Application in an Intent via a Background Registration.
U.S. Appl. No. 61/697,511, filed, Sep. 6, 2012, Channel for Opening and Editing Files from a Cloud Service Provider Based on Intents.
U.S. Appl. No. 13/776,535, filed Feb. 25, 2013, System and Method for Creating a Secure Channel for Inter-Application Communication Based on Intents.
U.S. Appl. No. 61/715,208, filed Oct. 17, 2012, Adaptive Architectures for Encryption Key Management in a Cloud-Based Environment.
U.S. Appl. No. 14/056,899, filed Oct. 17, 2013, Remote Key Management in a Cloud-Based Environment.
U.S. Appl. No. 61/709,086, filed Oct. 2, 2012, Visibility, Access Control Advanced Reporting Api, and Enhanced Data Protection and Security Mechanisms for Administrators in an Enterprise.
U.S. Appl. No. 14/472,540, filed Aug. 29, 2014, Enhanced Remote Key Management for an Enterprise in a Cloud-Based Environment.

* cited by examiner

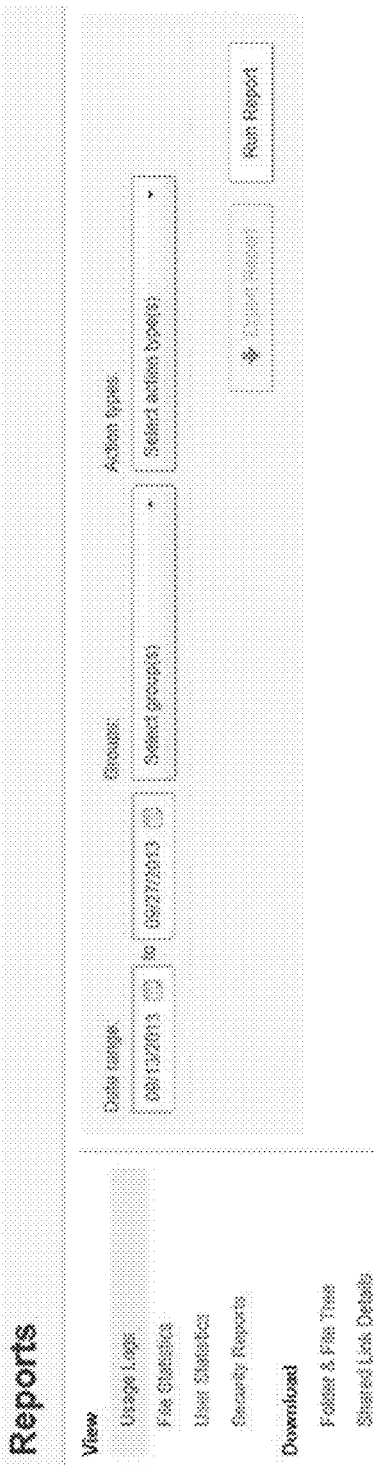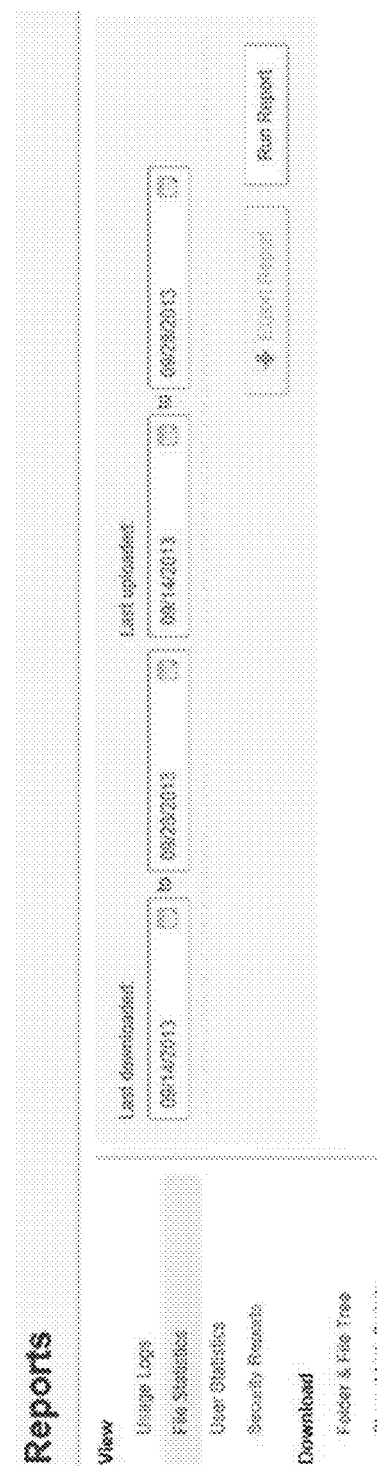
FIG. 5
FIG. 6

SYSTEM AND METHOD FOR ENHANCED SECURITY AND MANAGEMENT MECHANISMS FOR ENTERPRISE ADMINISTRATORS IN A CLOUD-BASED ENVIRONMENT

CROSS-REFERENCE TO RELATED APPLICATIONS AND EFFECTIVE FILING DATE ENTITLEMENT

This application claims the benefit of and/or the right of priority to U.S. Provisional Patent Application No. 61/708,926 entitled, "ADVANCED CONTROL TOOLS AND ENTERPRISE-WIDE SEARCH FOR ADMINISTRATORS IN AN ENTERPRISE," which was filed Oct. 2, 2012; and U.S. Provisional Patent Application No. 61/709,086 entitled, "VISIBILITY, ACCESS CONTROL, ADVANCED REPORTING API, AND ENHANCED DATA PROTECTION AND SECURITY MECHANISMS FOR ADMINISTRATORS IN AN ENTERPRISE," which was filed Oct. 2, 2012, the contents of which are incorporated by reference in their entireties herein. This application is therefore entitled to an effective filing date of Oct. 2, 2012.

This application is also related to U.S. Provisional Patent Application No. 61/677,249 entitled "ADVANCED SEARCH AND FILTERING MECHANISMS FOR ENTERPRISE ADMINISTRATORS IN A CLOUD-BASED ENVIRONMENT," which was filed on Jul. 30, 2012; and U.S. Provisional Patent Application No. 61/706,546 entitled "ADVANCED SEARCH AND FILTERING MECHANISMS FOR ENTERPRISE ADMINISTRATORS IN A CLOUD-BASED ENVIRONMENT," which was filed on Sep. 27, 2012, the contents of which are incorporated by reference in their entireties herein.

BACKGROUND

Enterprises store and retain large amounts of data that need to be navigable among multiple enterprise users and the administrator of the enterprise account. For security, compliance, or archival purposes, the administrator should be able to search across all content stored in the enterprise account.

Further, security continues to be a major area of concern as more and more enterprises adopt cloud-based solutions for content management. When corporate content that is potentially stored in the cloud is accessed by many corporate users, there is typically an administrator that oversees and monitors the use of the cloud. Among other functions, the administrator may be responsible for ensuring the security of the corporate data stored in the cloud, particularly with the increased access of cloud content via mobile devices.

BRIEF DESCRIPTION OF THE DRAWINGS

Examples of a cloud-based platform (e.g., cloud-based collaboration and/or storage platform/service) that provides data loss protection, an application programming interface (API) for reporting and monitoring events and activity that occur in the cloud-based platform, advanced search capabilities for an administrator of an enterprise account, and two-step login verification are illustrated in the figures. The examples and figures are illustrative rather than limiting.

FIG. 5 depicts a screenshot showing an example of a user interface for an administrator of an enterprise requesting a report on usage logs.

FIG. 6 depicts a screenshot showing an example of a user interface for an administrator of an enterprise requesting a report on file statistics.

DETAILED DESCRIPTION

A cloud-based platform (e.g., cloud-based collaboration and/or storage platform/service) is described that provides administrators with better visibility into content and activity across an enterprise account via advanced search tools and activity reports. Administrator tools are also provided that allow for actively managing content and passively monitoring content with real-time alerts sent to the administrator if usage of the cloud-based platform changes within the enterprise account. A reporting API is also supported by the cloud-based platform to permit the platform's activity logs to be retrieved by a third-party platform. Additionally, administrators are provided with the option to select two-step login verification of enterprise account users.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
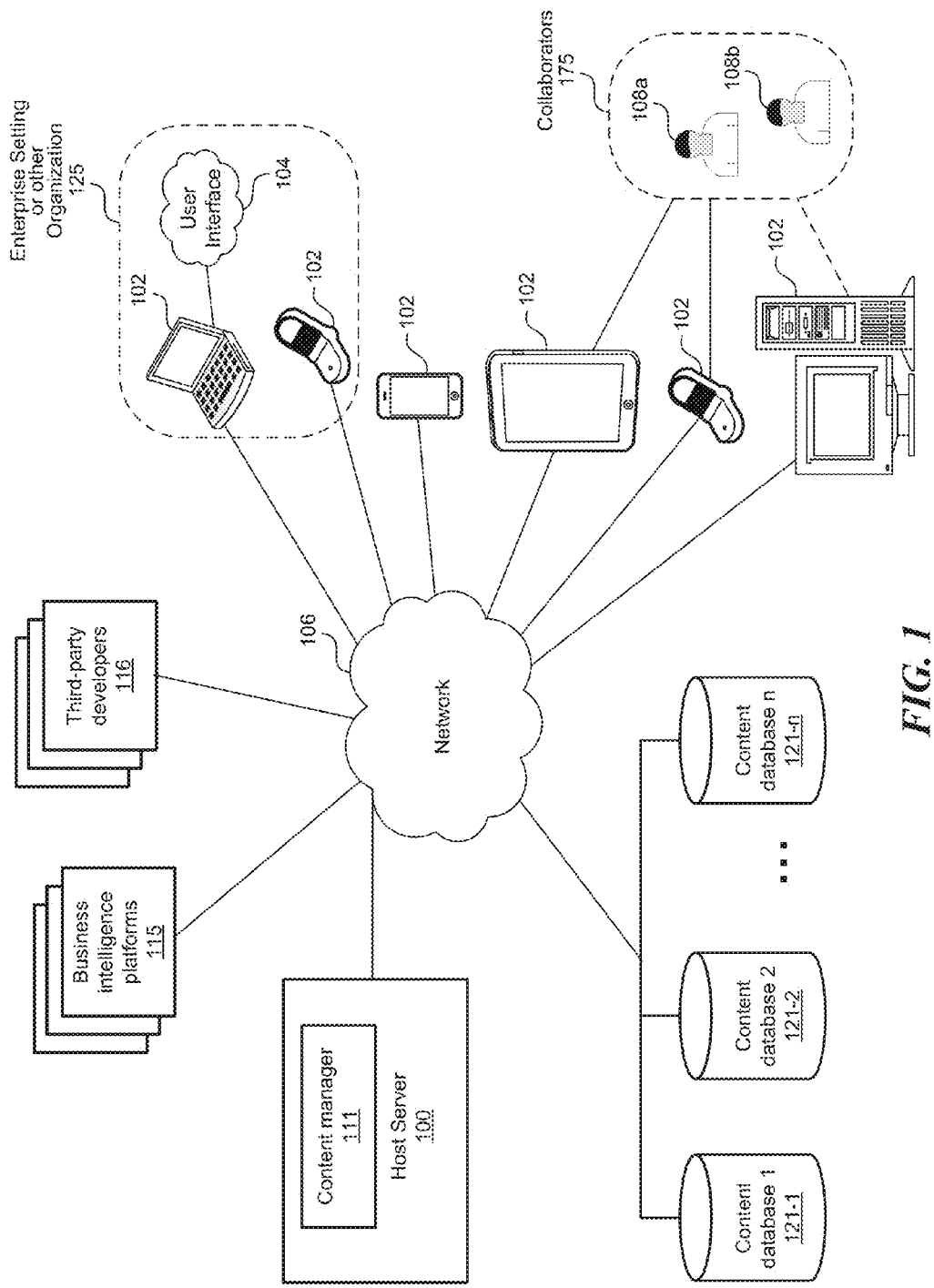
FIG. 1 illustrates an example diagram of a system where a host server supports data loss protection, a reporting API, advanced search capabilities for an administrator of an enterprise account, and two-step login verification for a cloud-based platform (e.g., cloud-based collaboration and/or storage platform/service).

FIG. 1 illustrates a diagram of an example system that has a host server 100 with a content manager 111 that allows an administrator to perform and store advanced searches across data stored within a cloud-based platform (e.g., cloud-based collaboration and/or storage platform/service) by members of an enterprise or organization, supports a reporting API to retrieve events in an enterprise account on a per-user and a per-enterprise basis, implements or enables data loss prevention for documents uploaded to the cloud-based platform, and permits an administrator to require two-step login verification to be performed for all users of the enterprise account.

The client devices 102 can be any system and/or device, and/or any combination of devices/systems that is able to establish a connection, including wired, wireless, cellular connections with another device, a server and/or other systems such as host server 100 via, for example, a web application. Client devices 102 will typically include a display and/or other output functionalities to present information and data exchanged between or among the devices 102 and/or the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), iOS powered watch, Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In some embodiments, the client devices 102, and host server 100 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a cloud-based platform (e.g., cloud-based collaboration and/or storage platform/service) (e.g., hosted by the host server 100). The collaboration environment or platform can have one or more collective settings 125 for an enterprise or an organization to which the users belong, and can provide a user interface 104 for the users to access such platform under the settings 125.

The cloud-based service (e.g., collaboration platform or environment) hosts workspaces with work items that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .PDF files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate on efforts on work items such that each user can see, remotely, edits, revisions, comments, or annotations being made to specific work items through their own user devices. For example, a user can upload a document to a workspace for other users to access (e.g., for viewing, editing, commenting, discussing, signing-off, or otherwise manipulating). The user can login to the online platform and upload the document (or any other type of work item) to an existing workspace or to a new workspace. The document can be shared with existing users or collaborators in a workspace. Each document, work item, file, and folder can only be owned by a single user. However, the owner of the document, work item, file, or folder can transfer ownership to another collaborator.

The content databases 121-1 to 121-n store files and folders uploaded to the cloud-based platform (e.g., cloud-based collaboration and/or storage platform/service) along with metadata for the uploaded files and folders. The uploaded data can be searched by, for example, the metadata, such as tags, users, owners, and creation or update date.

The business intelligence platforms 115 are external platforms that provide analytical business intelligence tools that can be used analyze an enterprise's data and how enterprise users use the data stored in the cloud-based platform. The business intelligence tools can increase insight into a company's stored content and provide strategic management of the company's assets and operation. The business intelligence platforms 115 access an enterprise's data stored in the cloud-based platform via a reporting API that allows administrators to actively monitor events occurring within the company's enterprise account as enterprise users and external collaborators create, upload, and share content.

The third-party developers 116 are external developers that provide services to users of the cloud-based platform. For example, a third-party developer 116 can provide security as a service by offering data loss prevention services for files uploaded to the cloud-based platform.

In some embodiments, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In some embodiments, communications to and from the client devices 102 can be achieved by, an open network, such as the Internet, or a private network, such as an intranet and/or the extranet. In some embodiments, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 2:
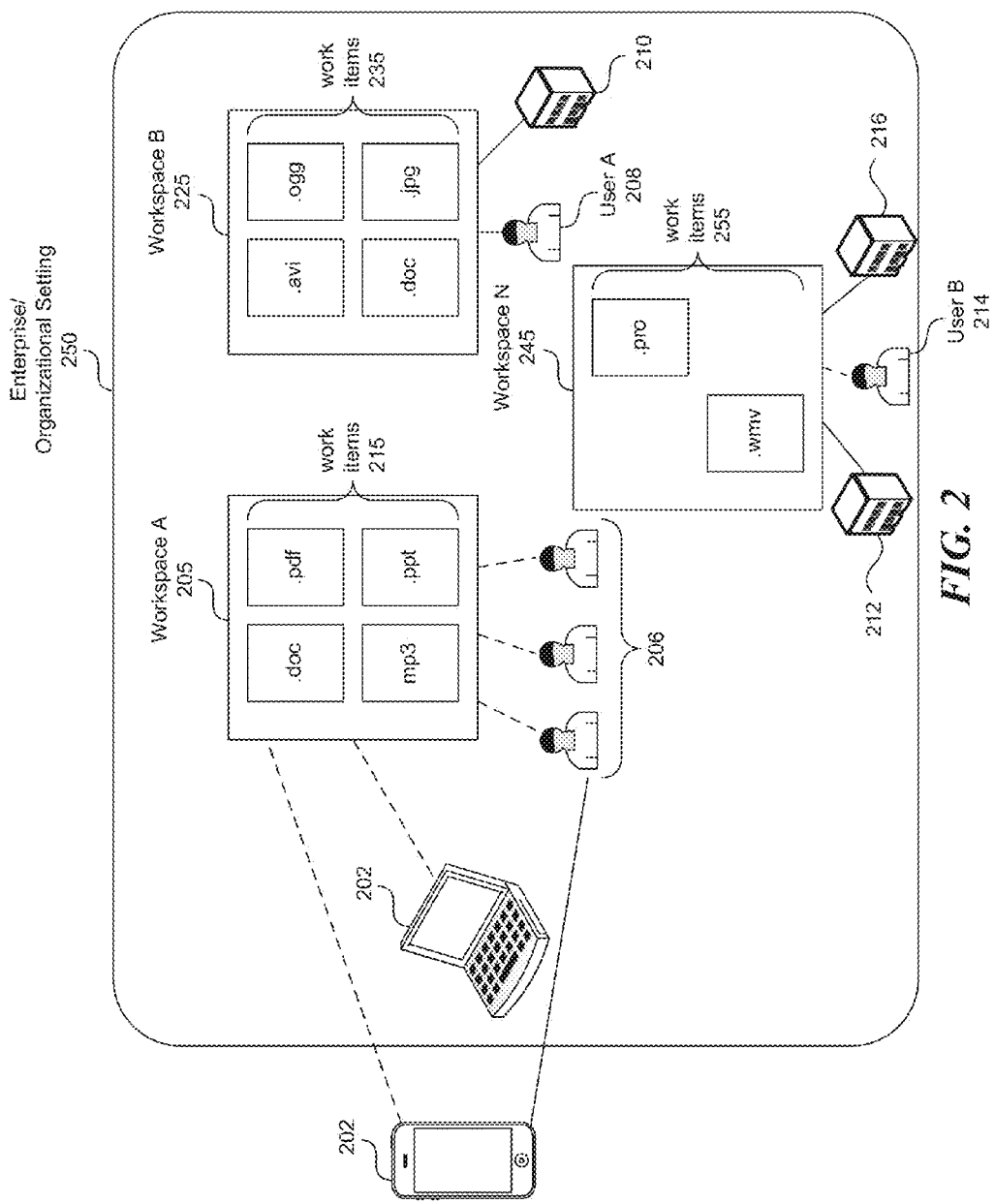
FIG. 2 depicts an example diagram of a web-based or cloud-based platform (e.g., cloud-based collaboration and/or storage platform/service) deployed in an enterprise or other organizational setting for organizing work items and workspaces.

FIG. 2 depicts an example diagram of a web-based or cloud-based platform (e.g., cloud-based collaboration and/or storage platform/service) deployed in an enterprise or other organizational setting 250 for organizing workspaces 205, 225, 245 and work items 215, 235, 255, where the work items and workspaces are hosted on content databases 1, 2, . . . n 121-1, 121-2, . . . 121-n.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, workspace A 205 may be associated with work items 215, workspace B 225 can be associated with work items 235, and workspace N 245 can be associated with work items 255. The work items 215, 235, and 255 may be unique to each workspace but need not be. For example, a particular word document can be associated with only one workspace (e.g., workspace A 205) or it may be associated with multiple workspaces (e.g., workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as example user A 208, and workspace N 245 can be associated with departments 212 and 216 and users shown as example user B 214.

Figure 3A:
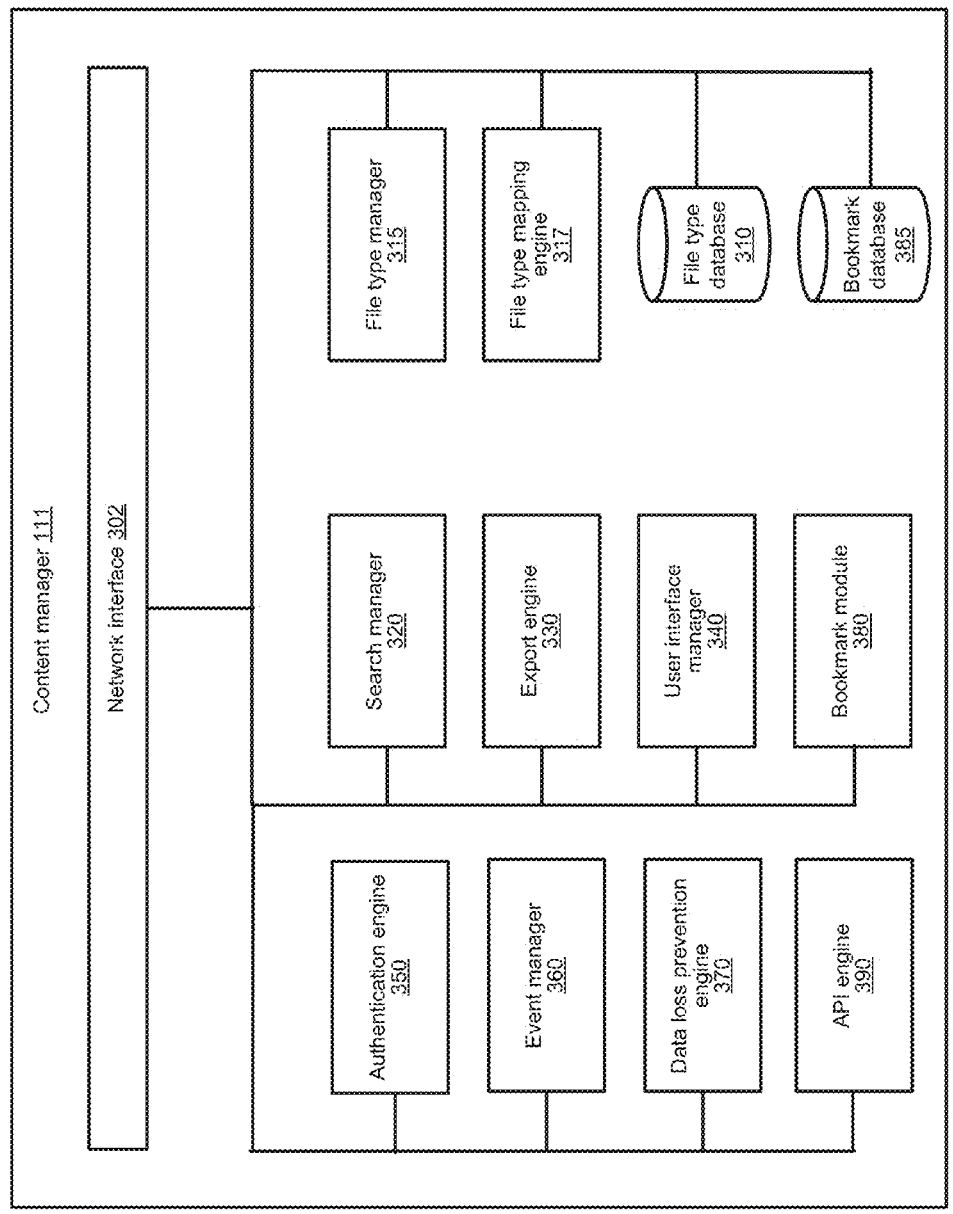
FIG. 3A depicts a block diagram illustrating an example of components in the content manager of a cloud-based platform (e.g., cloud-based collaboration and/or storage platform/service).

FIG. 3A depicts a block diagram illustrating an example of components in the content manager 111 of the host server 100 of a cloud-based platform (e.g., cloud-based collaboration and/or storage platform/service).

The host server 100 of the cloud-based platform (e.g., cloud-based collaboration and/or storage platform/service) can generally be a cloud-based service. The content manager 111 of the host server 100 can include, for example, a network interface 302, a search manager 320, an export engine 330, a user interface manager 340, a file type manager 315, a file type mapping engine 317, a file type database 310, an authentication engine 350, an event manager 360, a data loss prevention engine 370, an API engine 390, a bookmark module 380, and/or a bookmark database 385. Additional or fewer components/modules/engines can be included in the host server 100, the content manager 111, and each illustrated component.

The network interface 302 can be a networking module that enables the content manager 111 to mediate data in a network with an entity that is external to the content manager 111, through any known and/or convenient communications protocol supported by the content manager 111 and the external entity. The network interface 302 can include search manager 320 in a search of the enterprise's content stored in the content databases 1-n 121-1-121-n.

TABLE 1

| Field | Operations | N-gram? | Shortcut(s) |
|---|---|---|---|
| Name | Contains | Yes | Name:[term] Name contains term |
| Content | Contains | Yes | Content:[term] Content contains term |
| Description | Contains | No | Description:[term] Description contains term |
| Comments | Contains | No | Comment:[term] A Comment contains term |
| Created | Before/Between/After | N/A | Created:[date] Created on date<br>Created>[date] Created after date<br>Created<[date] Created before date |
| Updated | Before/Between/After | N/A | Updated:[date] Updated on date<br>Updated>[date] Updated after date<br>Updated<[date] Updated before date |
| — | — | — | Date:[date] Created or Updated on date<br>Date>[date] Created or Updated after date<br>Date<[date] Created or Updated before date |
| Owner | In | N/A | Owner:[term] Folder owner is term |
| File size | Greater than/Less than/Equal/Between | N/A | Size:[number+unit] Size is number<br>Size>[number+unit] Size is greater than number<br>Size<[number+unit] Size is less than number<br>If no unit entered, default to MB |
| File type | In | No | Type:[term] Type is term<br>Use file extension only |
| Folders | In | No | [Folders] Limits search to folders only |
| Files | In | No | [Files] Limits search for files only |
| Tags | In | No | Tag:[term] A Tag contains term | one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "manager," or an "engine" includes a general purpose, dedicated or shared processor and, typically, firmware or software modules that are executed by the processor. Depending upon implementation-specific or other considerations, the module or engine can be centralized or its functionality distributed. The module or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Some embodiments of the content manager 111 include the search manager 320 which can receive requests from an administrator of an enterprise account for a search based on particular search criteria across all accounts associated with the enterprise. The search manager 320 permits an administrator to access content across all users or select groups of users or other entities in the administrator's enterprise. Non-limiting examples of search filters that can be selected by the administrator for applying to a search are shown in Table 1 and include users, folders, file kind, creation date, update date, size, owner, and tag. One or more of these filters can be selected by an administrator to be applied by the Some embodiments of the content manager 111 include the user interface manager 340 which can display or cause to be displayed the various filters and filter options that are available to an administrator of an enterprise and the administrator's filter selections. General categories of filters include users, folders, and kind. Additional filters can also be selected in addition or instead of the general categories of filters, as discussed below.

Searching can be performed within one or more selected folders. Searching can also be performed based on a specific kind. Non-limiting examples of kinds include everything, folder, description, comment, file content, file, Word document, drawing, image, PDF, presentation, spreadsheet, music, and video.

Additional filters can be added or used instead of the ones described above. Non-limiting examples of additional filters include, creation date of a file, update date of a file, size of a file, owner of a file, and a tag for a file.

If the administrator selects creation date of a file as an additional filter, the user interface manager 340 will prompt the administrator to provide a beginning date and an end date for the range of creation dates to be searched. Alternatively, the administrator can choose to enter just a beginning date to search for all files created after the entered data or just an end date to search for all files created before the entered date.

Once a particular additional filter has been selected, for example, creation date, the menu for available additional filters will include only additional filters that have not previously been selected.

If the administrator selects update date as a search filter, the user interface manager 340 will prompt the administrator for a beginning date and an end date for the range of update dates to be searched. Alternatively, the administrator can choose to enter just a beginning date to search for all files updated after the entered data or just an end date to search for all files updated before the entered date.

If the administrator selects file size as a search filter, the user interface manager 340 will prompt the administrator for a minimum file size and a maximum file size for the range of file sizes to be searched. Alternatively, the administrator can choose to enter just a minimum file size to search for all files greater than the entered size or just a maximum file size to search for all files less than the entered size.

If the administrator selects file owner as a search filter, the user interface manager 340 will prompt the administrator for the owner name to be searched. A file owner can be identified either by a username or email address.

If the administrator selects tags as a search filter, the user interface manager 340 will prompt the administrator for the tags to be searched.

In some embodiments, the additional filter can allow the administrator to select an additional file type or enter a particular file extension.

If the administrator has selected several search filters to be applied, the user interface manager 340 can display or cause to be displayed the selections simultaneously.

The administrator can also enter a search term and click on the search button. Then the search manager 320 performs the search with the selected filters. The user interface manager 340 can also display cause to be displayed the results of a search requested by the administrator.

Some embodiments of the content manager 111 include the export engine 330 which can export search results upon request, for example, via downloading by the administrator. The export engine 330 can place the search results in a requested format, for example, in an excel spreadsheet or as comma separated values (CSV), prior to exporting. Additionally, the export engine 330 can export the search results in its entirety or further allow the administrator to filter the results prior to exporting. In some embodiments, the export engine 330 can export search results and reports on user activity in an enterprise account via the API engine 390 as discussed further below.

Some embodiments of the content manager 111 include the file type mapping engine 317 which can receive a specified mapping between a specific file type and a specific kind and store the received mapping in a file type database 310. For example, files that have any of the following extensions can be mapped to the kind 'audio': aac, aiff, flac, m4a, mp3, mp4, way, and wma; files that have any of the following extensions can be mapped to the kind 'document': doc, docx, fodt, gdoc, odt, pages, rtf, txt, webdoc; files that have any of the following extensions can be mapped to the kind 'image': bmp, gif, jpeg, png, and tiff; files that have any of the following extensions can be mapped to the kind 'presentation': fodp key, keynote, odp, pez, ppt, and pptx; files that have any of the following extensions can be mapped to the kind 'spreadsheet': csv, fods, gsheet, numbers, ods, tsv, xls, and xlsx; files that have any of the following extensions can be mapped to the kind 'video': fla, fly, m4v, mov, mpeg, mpg, and swf; and files that have the file extension pdf can be mapped to the kind 'pdf'. These file extensions are just non-limiting examples. Other file extensions may also be mapped to one of these kinds or to a different kind, and the file extensions listed above may be mapped to other kinds.

As shown in FIG. 3A, the file type database 310 is part of the content manager 111. However, in some embodiments, the file type database 310 can be external to the content manager 111. In some embodiments, the file type database 310 is accessed via the network 106 by the content manager 111.

Some embodiments of the content manager 111 include the file type manager 315 which can determine the file extension of uploaded files, and look up in the file type database 310 the corresponding kind for that particular file extension. Then the file type manager 315 stores the determined kind as metadata for the file. Subsequent searches for files that have the determined kind will yield the file in the search results obtained by the search manager 320.

Some embodiments of the content manager 111 include the bookmark module 380 which can save searches as a bookmark in the bookmark database 385. The bookmark module 380 is configured to store a search in the bookmark database 385 in response to receiving a request from an administrator to save the search that has been selected by the administrator. Then if the administrator wants to re-use the same search query, the administrator can select it from a list of bookmarked queries provided by the bookmark module 380. For example, the administrator can construct and bookmark a search query for later use that searches for all video files uploaded in the last 48 hours, or that searches for all folders created by a specific user.

As shown in FIG. 3A, the bookmark database 385 is part of the content manager 111. However, in some embodiments, the bookmark database 385 can be external to the content manager 111. In some embodiments, the bookmark database 385 is accessed via the network 106 by the content manager 111.

FIGS. 11A-11D depict a flow chart illustrating an example process of searching by an administrator across an enterprise in a cloud-based platform (e.g., cloud-based collaboration and/or storage platform/service).

At block 1105, the content manager receives one or more search terms from the administrator for searching across the enterprise documents or a selection of a bookmarked search previously saved. Then at decision block 1110, the content manager determines whether the administrator wants to search by user. If the administrator indicates that a search should be performed by user of the documents (block 1110—Yes), at block 1112, the content manager provides a list of managed users associated with the enterprise. In some embodiments, the content manager also provides a list of unmanaged users who collaborated with the managed users. The content manager can support the display of collaborated content by a given unmanaged user such that the unmanaged user appears in the user filter or a browse user tree. Documents from both managed users and unmanaged users are discoverable by the administrator in a search because the administrator should be able to find and identify content across the enterprise for security, compliance, or archival purposes.

Then at block 1114, the content manager receives the selection of users to be searched and indicates the selected users in the user interface. If the administrator does not indicate that a search should be performed by user (block 1110—No), at decision block 1120, the content manager determines whether the administrator wants to search by folder. If the administrator indicates that a search should be performed by folder (block 1120—Yes), the content manager provides a list of folders associated with the enterprise at block 1122. Then at block 1124, the content manager receives the selection of folders to be searched and indicates the selected folders in the user interface.

If the administrator does not indicate that a search should be performed by folder (block 1120—No), at decision block 1130, the content manager determines whether the administrator wants to search by kind. If the administrator indicates that a search should be performed by kind (block 1130—Yes), the content manager provides a list of kinds that can be searched at block 1132. Then at block 1134, the content manager receives the selection of kind to be searched and indicates the selected kind in the user interface.

If the administrator does not indicate that a search should be performed by kind (block 1130—No), at decision block 1140, the content manager determines whether a filter should be added to the search criteria. If the administrator indicates that a search should be performed with another search filter (block 1140—Yes), the administrator can select from the following search filters: creation date, update date, size, owner, tag, file name, folder name, file content, type, file comment, and/or file description.

If the administrator selects filtering by creation data, at blocks 1141 and 1142, the content manager prompts the administrator for and receives the beginning date and the end date for the range of file creation dates to be searched. Then the process returns to decision block 1140 to determine whether another search filter should be added.

If the administrator selects filtering by update data, at blocks 1144 and 1145, the content manager prompts the administrator for and receives the beginning date and the end date for the range of file update dates to be searched. Then the process returns to decision block 1140 to determine whether another search filter should be added.

If the administrator selects filtering by size, at blocks 1147 and 1148, the content manager prompts the administrator for and receives the minimum size and the maximum size of the files to be searched. Then the process returns to decision block 1140 to determine whether another search filter should be added.

If the administrator selects filtering by owner, at block 1150, the content manager provides a list of owners of files associated with the enterprise. Then at block 1151, the content manager receives the selection of owners to be searched. The process returns to decision block 1140 to determine whether another search filter should be added.

If the administrator selects filtering by tag, at block 1153, the content manager provides a list of tags of files associated with the enterprise. Then at block 1154, the content manager receives the selection of tags to be searched. The process returns to decision block 1140 to determine whether another search filter should be added.

If the administrator selects filtering by file or folder name, at block 1156, the content manager prompts the administrator for and receives a term or terms in the name of the file or folder to be searched. The process returns to decision block 1140 to determine whether another search filter should be added.

If the administrator selects filtering by file content, at block 1158, the content manager prompts the administrator for and receives a term or terms in the content to be searched. The process returns to decision block 1140 to determine whether another search filter should be added.

If the administrator selects filtering by type, at block 1162, the content manager prompts the administrator for and receives a file extension to be searched. The process returns to decision block 1140 to determine whether another search filter should be added.

If the administrator selects filtering by file comment, at block 1164, the content manager prompts the administrator for and receives a term or terms in the comments to be searched. The process returns to decision block 1140 to determine whether another search filter should be added.

If the administrator selects filtering by file description, at block 1166, the content manager prompts the administrator for and receives a term or terms in the file descriptions to be searched. The process returns to decision block 1140 to determine whether another search filter should be added.

The content manager is not limited to the filters explicitly described above. Other search filters can also be provided by the content manager, for example, editor of a file, and file topic.

If the administrator indicates that no more filters are to be used in the search (block 1140—No), at block 1160, the content manager performs the search based upon the search terms and the selected filter criteria provided by the administrator and provides the results to the administrator. And at block 1170, the content manager displays the search results to the administrator. The administrator can elect to further filter the search results in a similar manner as described above.

Then at decision block 1180, the content manager determiners whether the performed search should be bookmarked. If the administrator does not indicate that the search should be bookmarked (block 1180—No), the process ends at block 1199. If the administrator indicates that the search should be bookmarked, at block 1182, the content manager stores the search term or terms in the bookmark database 385. Then at block 1184, the content manager provides a bookmark to the stored search to the administrator, and the process ends at block 1199.

Figure 3B:
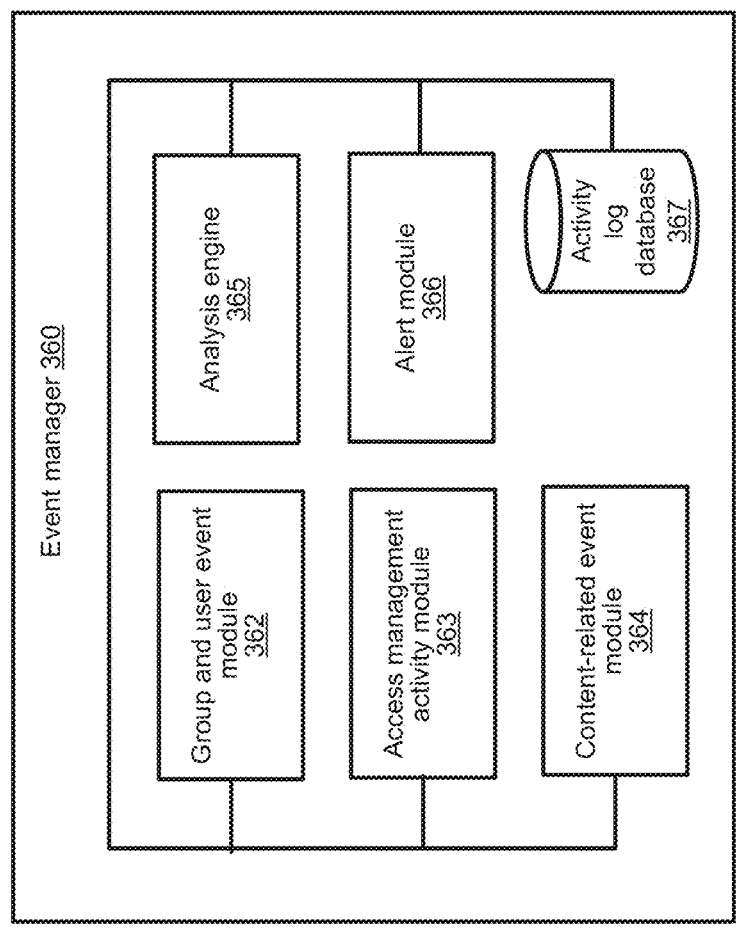
FIG. 3B depicts a block diagram illustrating an example of components in the event manager of a cloud-based platform (e.g., cloud-based collaboration and/or storage platform/service).
Figure 3C:
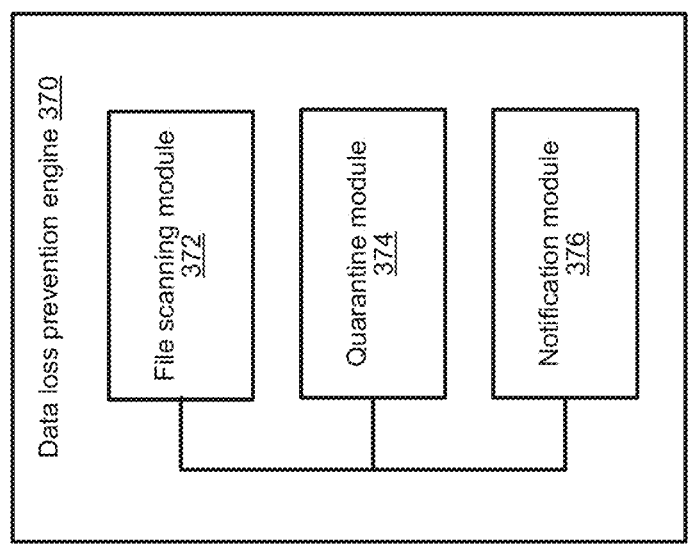
FIG. 3C depicts a block diagram illustrating an example of components in the data loss prevention engine of a cloud-based platform (e.g., cloud-based collaboration and/or storage platform/service).
Figure 3D:
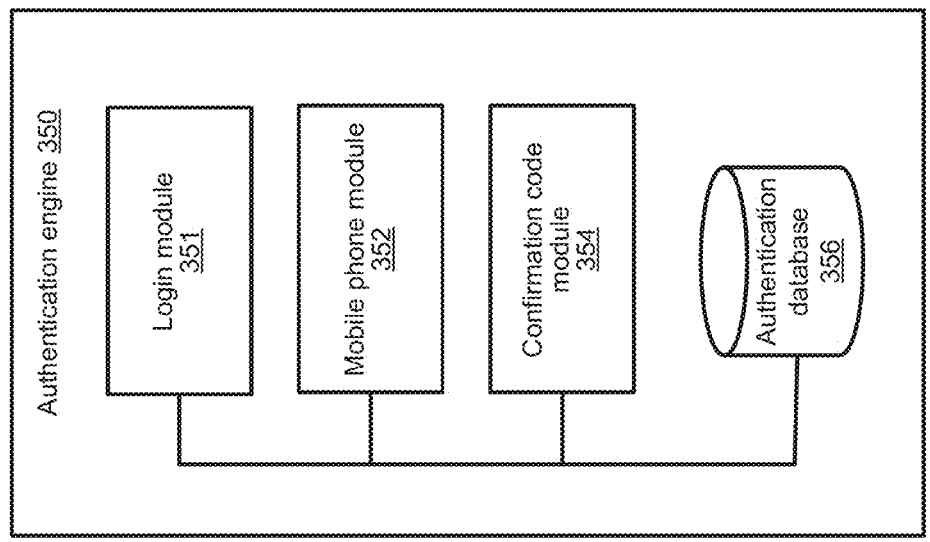
FIG. 3D depicts a block diagram illustrating an example of components in the authentication engine of a cloud-based platform (e.g., cloud-based collaboration and/or storage platform/service).

Returning to FIG. 3A, some embodiments of the content manager 111 include the authentication engine 350 which can permit an administrator to require members of an enterprise to use two-step verification for end-user authentication to protect against unauthorized access to enterprise content in the cloud-based platform. FIG. 3D depicts a block diagram illustrating an example of components in the authentication engine 350 of a cloud-based platform (e.g., cloud-based collaboration and/or storage platform/service). The authentication engine 350 can include a login module 351, mobile phone module 352, a confirmation code module 354, and/or an authentication database 356. As shown in FIG. 3D, the authentication database 356 is part of the authentication engine 350. However, in some embodiments, the authentication database 356 can be external to the authentication engine 350.

Figure 4:
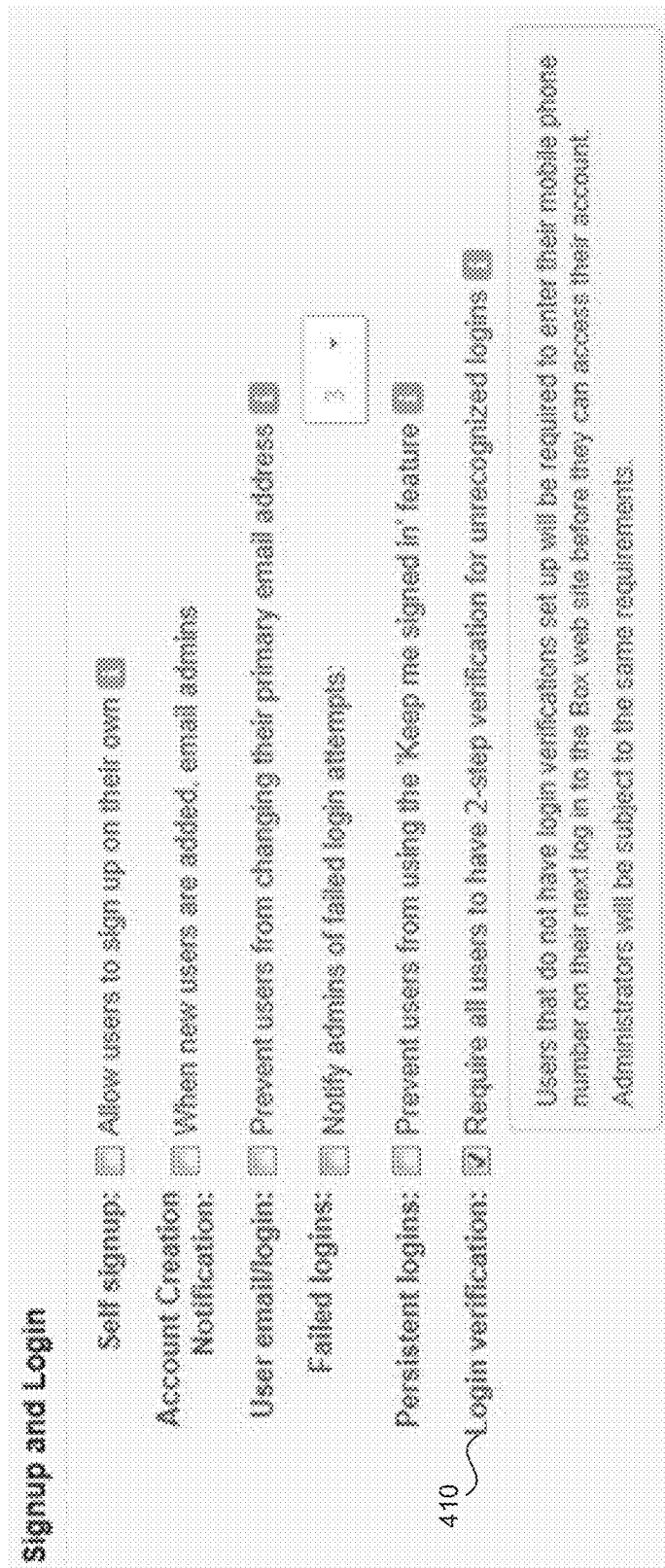
FIG. 4 depicts a screenshot showing an example of a user interface for an administrator of an enterprise selecting two-step login verification for all members of the enterprise.

The authentication engine 350 provides a user interface to the administrator to enable two-step verification for member logins, as shown in the example screenshot in FIG. 4. When this feature is enabled by the administrator, enterprise members are required to log in to initiate an association with the member's respective mobile phone number. When a user logs into his account that is part of the administrator's enterprise account, the login module 351 determines whether the member user previously provided a mobile phone number to which confirmation codes can be sent. The login module 351 can access the authentication database 356 which stores mobile phone numbers associated with member users to determine whether there is a mobile phone number associated with the user's account.

Figure 9A:
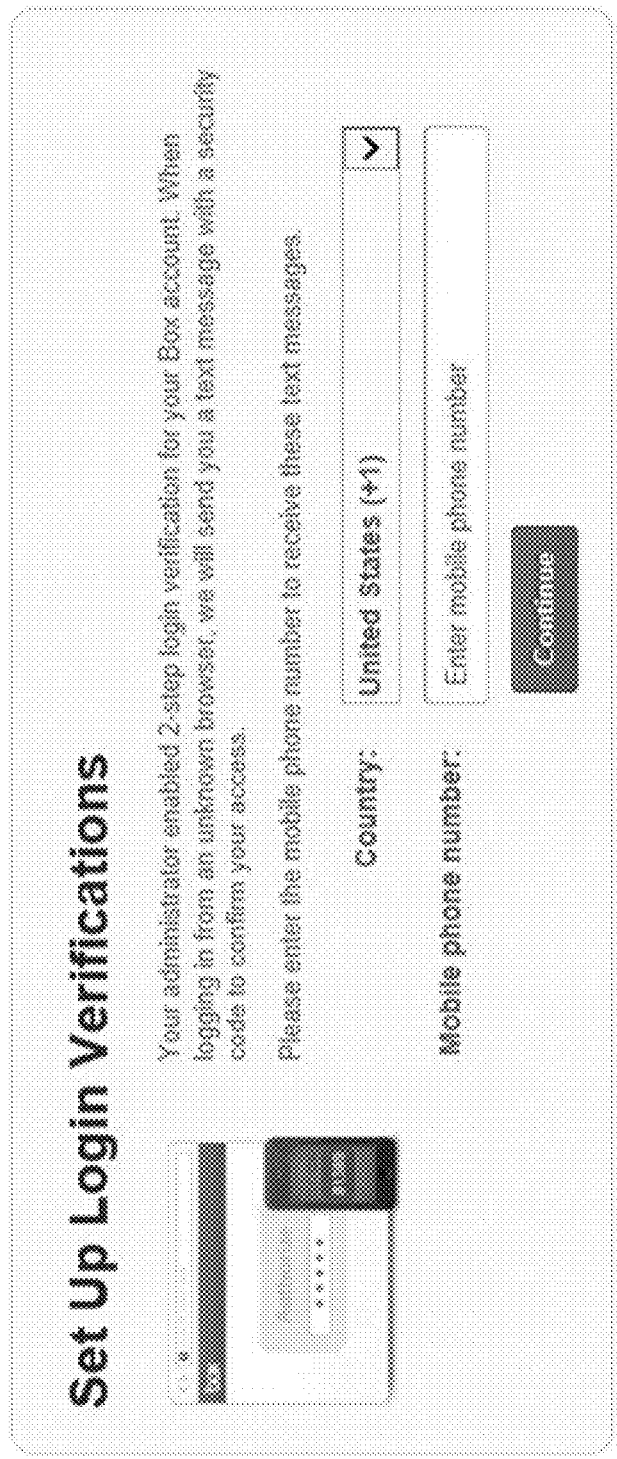
FIGS. 9A-9C depict screenshots showing examples of user interfaces for communicating with a user regarding implementing two-step verification.

If a member user has not previously provided a mobile phone number, the mobile phone module 352 requests the user's mobile phone number. FIG. 9A shows an example screenshot that informs the user that the administrator of the enterprise account has enabled two-step login verification and requests a mobile phone number for receiving a confirmation code. The mobile phone module 352 then stores the mobile phone number received from the member user in the authentication database 356.

Figure 9B:
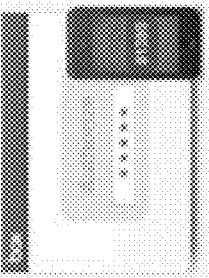

The confirmation code module 354 then sends a confirmation code, for example, by text message, to the member's mobile phone number. Then the confirmation code module 354 requests that the user enter the confirmation code to confirm the provided phone number. FIG. 9B shows an example screenshot that provides instructions to the user for checking for a confirmation code on the user's mobile phone and for entering the confirmation code.

Figure 9C:
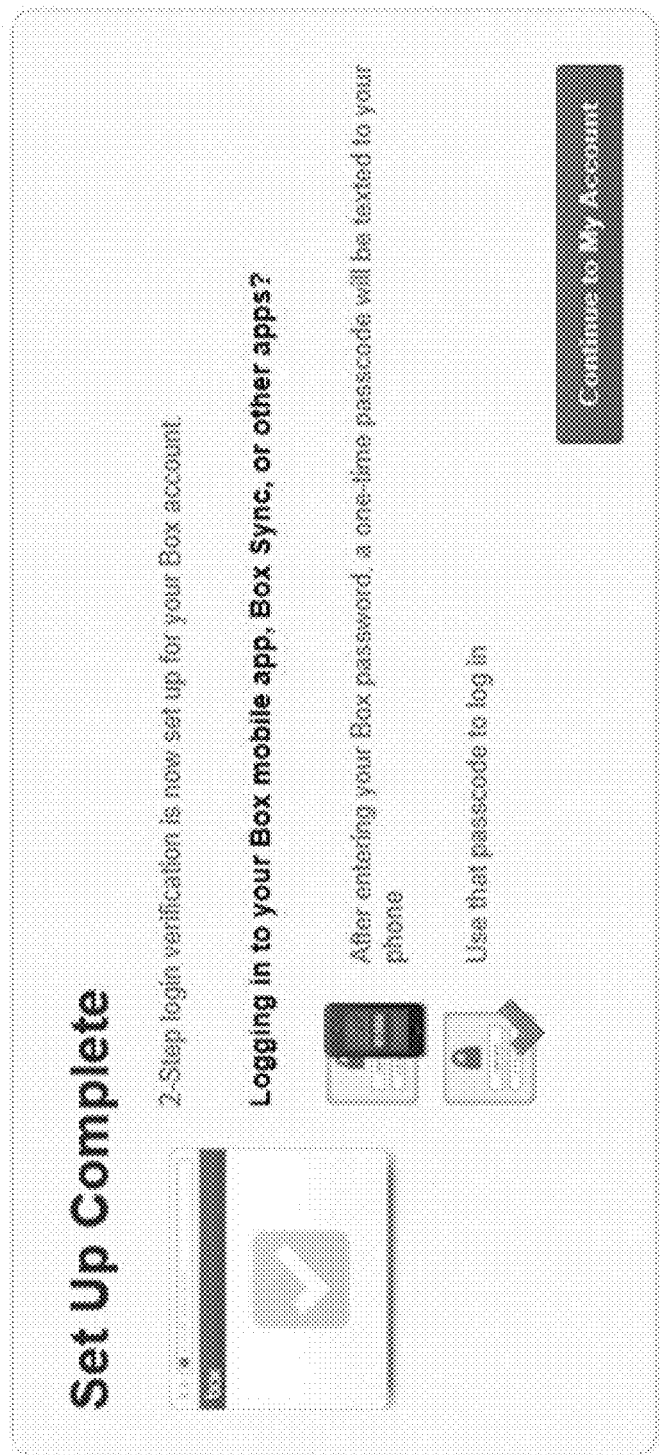

If the confirmation code entered by the user matches the confirmation code sent by the confirmation code module 354, the user is informed that the two-step login verification is complete. FIG. 9C shows an example screenshot that informs the user that the two-step login verification process is complete.

Then upon subsequent attempts by the member user to log in to the member user's account with the cloud-based platform, after the password is provided by the member user, the confirmation code module 354 sends the member user a confirmation code, for example by text message, to the user's mobile phone number. When the member user enters the confirmation code, if the confirmation code module 354 confirms that the entered code matches the code that was sent to the user's mobile phone, the user will be permitted to access his account on the cloud-based platform.

If a member user loses or misplaces a mobile phone that has been associated with the user's account, the administrator is permitted to exempt the user from the two-step verification requirement. Then the authentication engine 350 will not send a confirmation code to the user's mobile phone and will allow the user to login by just providing the user's password.

Figure 10:
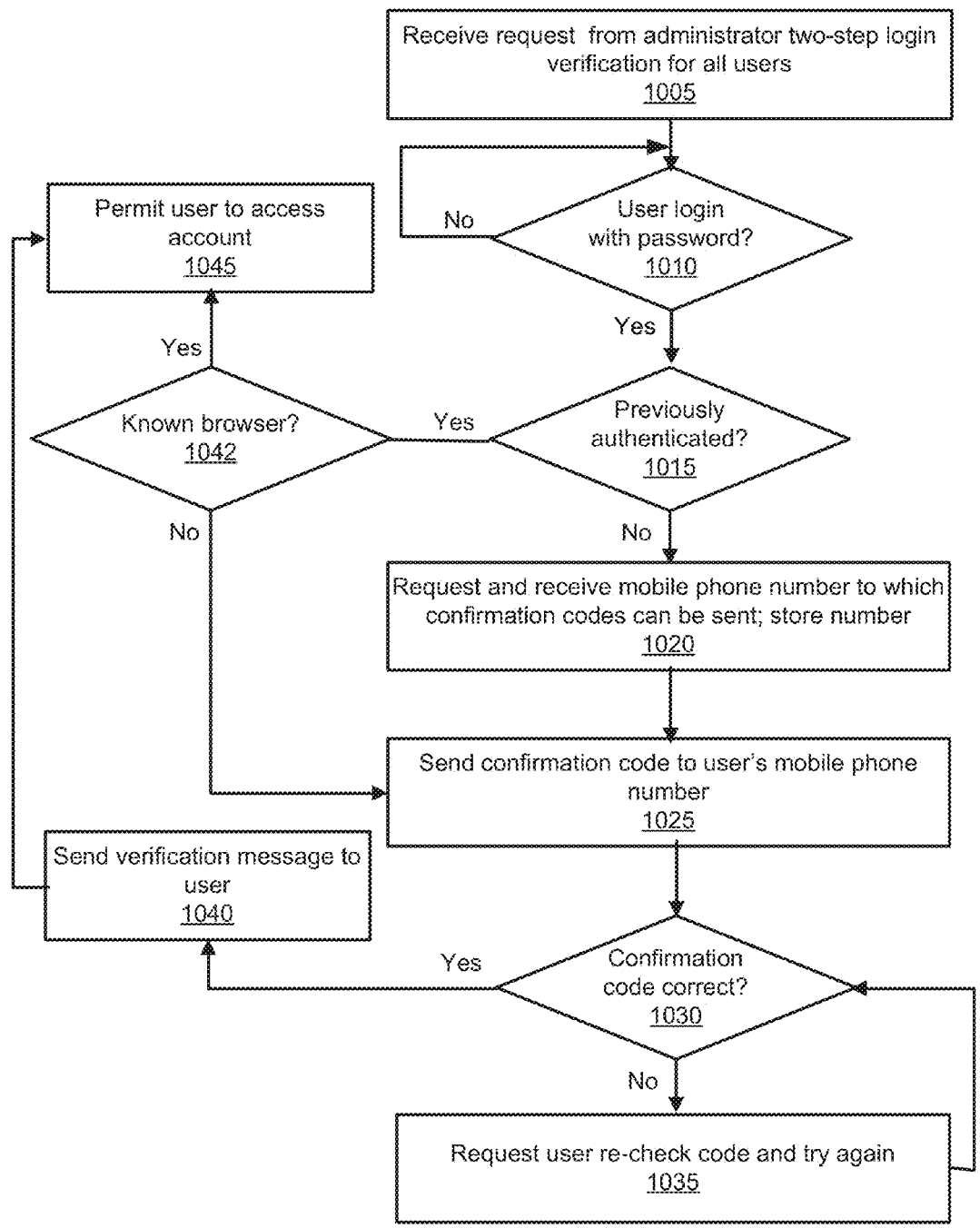
FIG. 10 depicts a flow chart illustrating an example process of implementing two-step login verification in a cloud-based platform (e.g., cloud-based collaboration and/or storage platform/service).
Figure 11A:
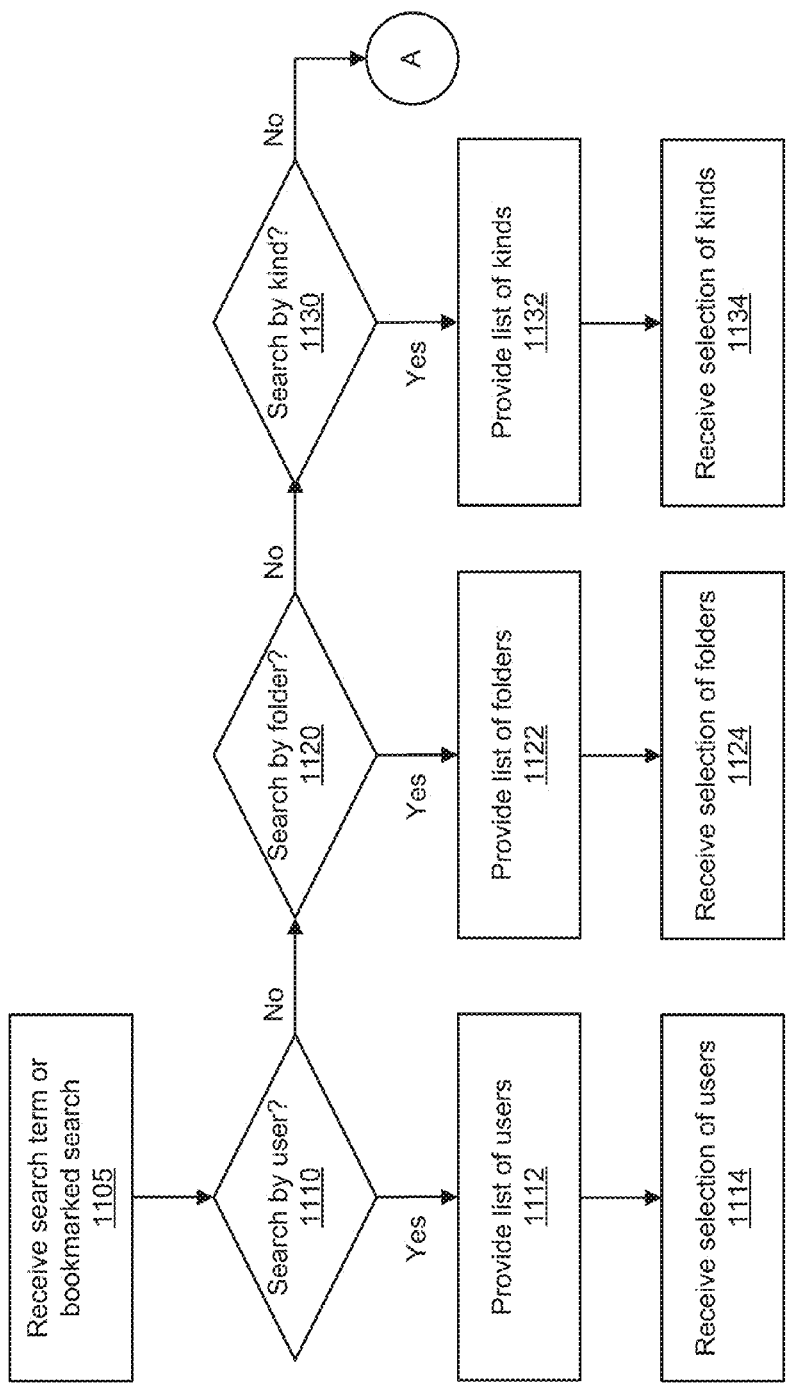
FIGS. 11A-11D depict a flow chart illustrating an example process of searching by an administrator across an enterprise in a cloud-based platform (e.g., cloud-based collaboration and/or storage platform/service).
Figure 11B:
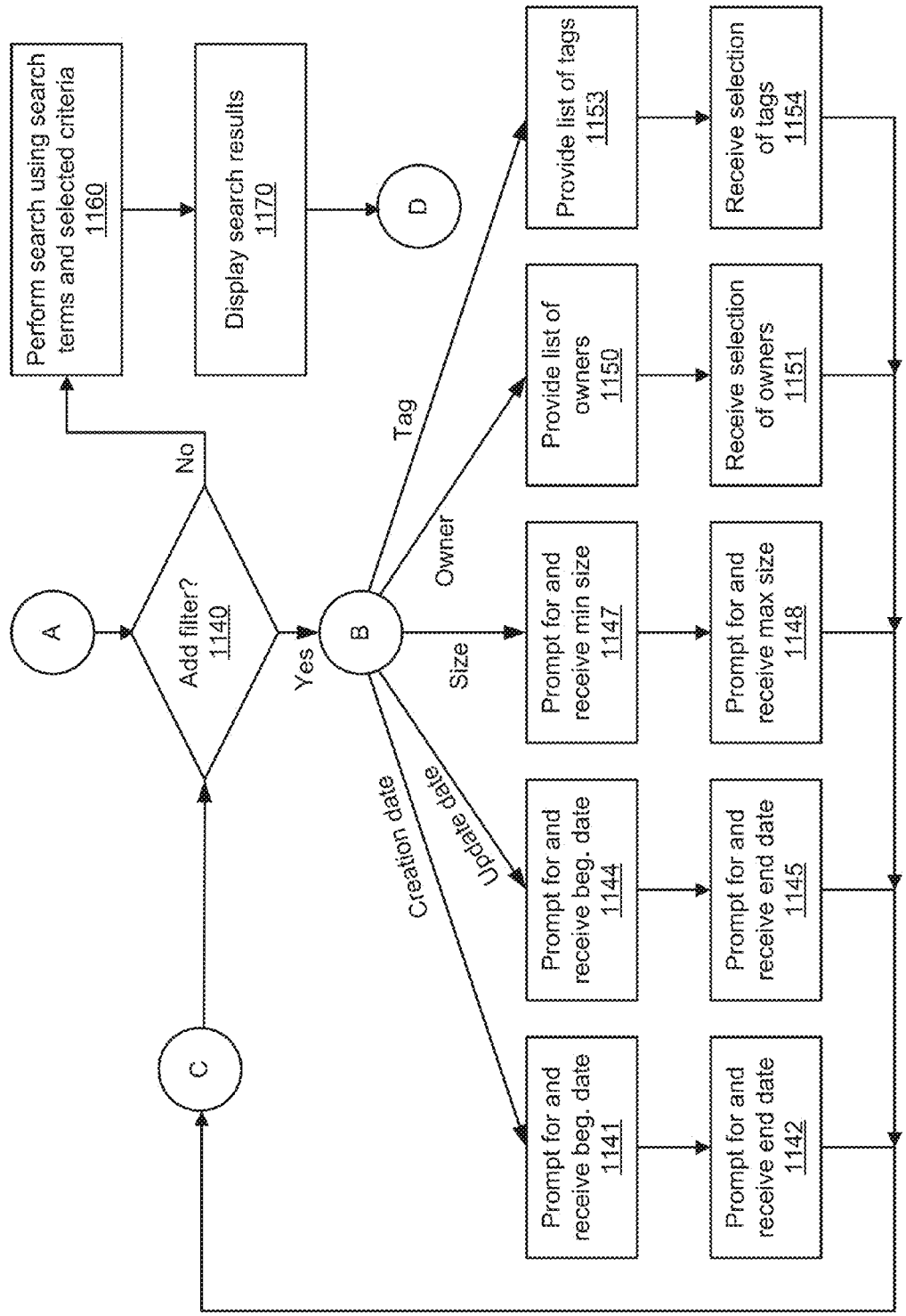
Figure 11C:
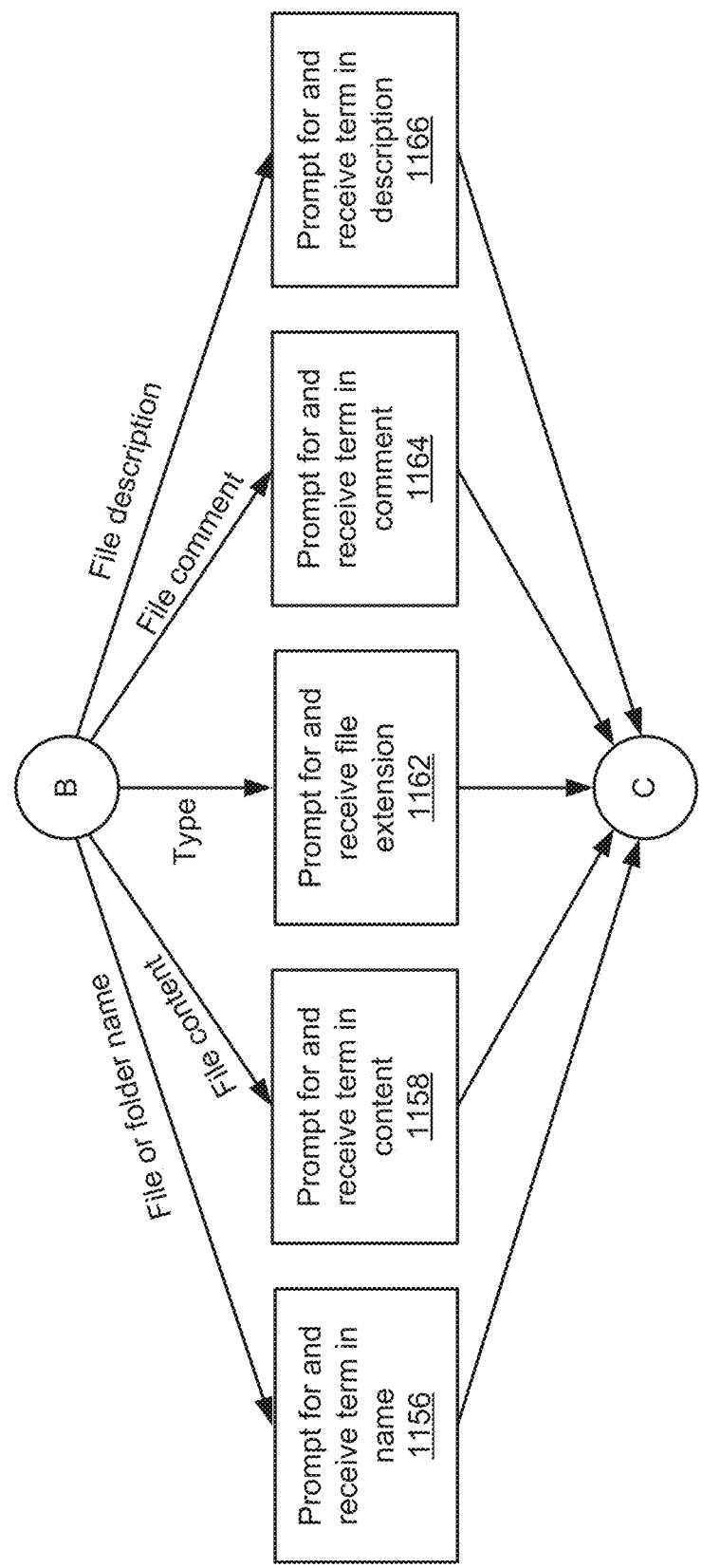
Figure 11D:
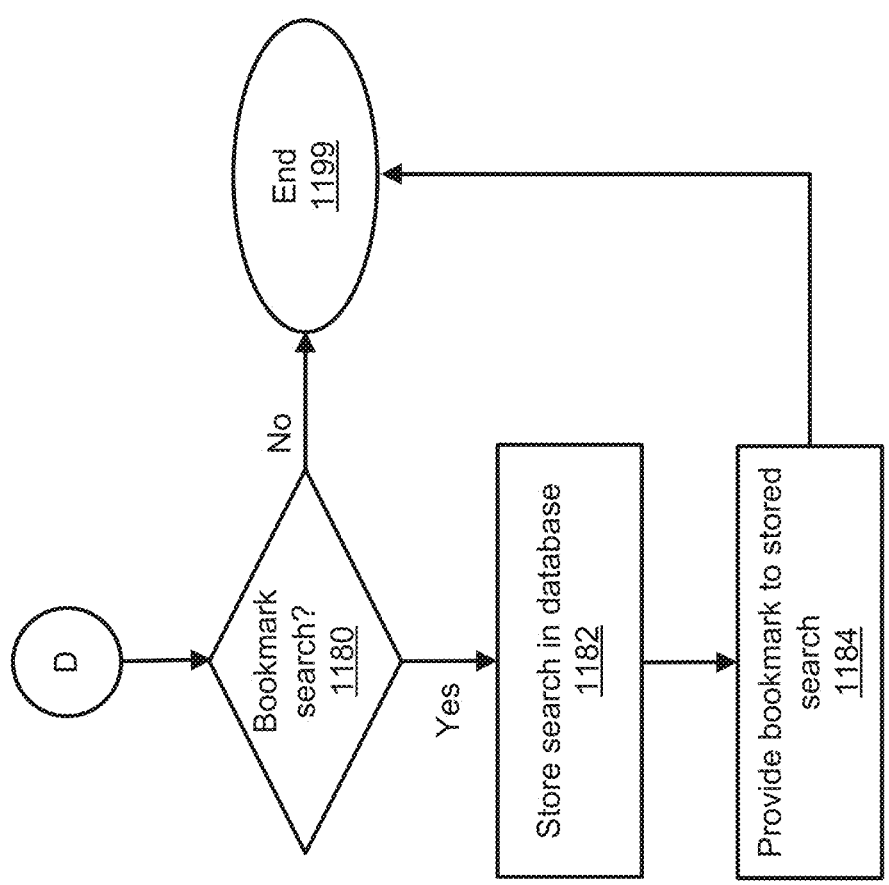

In some embodiments, a confirmation code may not be sent every time the member user logs in. For example, if the user has previously logged in to the cloud-based platform from a known browser, the authentication engine 350 may not use the two-step verification requirement. Known browsers used by user members of an enterprise can be stored in the authentication database 356. FIG. 10 depicts a flow chart illustrating an example process of implementing two-step login verification in a cloud-based platform (e.g., cloud-based collaboration and/or storage platform/service).

At block 1005, the content manager receives a request from an administrator of an enterprise account on the cloud-based platform for initiating a two-step login verification for all account users. Then at decision block 1010, the content manager determines whether a user has logged into an account associated with the enterprise account with a correct password. If a user has not logged in (block 1010—No), the process remains at decision block 1010.

If a user has logged in (block 1010—Yes), at decision block 1015, the content manager determines whether the user has been previously authenticated using two-step verification via a known browser. If the user has been previously authenticated (block 1015—Yes), at decision block 1042, the content manager determines whether the browser via which the user is attempting to log in is known browser. If the browser is known (block 1042—Yes), at block 1045 the user is permitted to access the user's account.

If the browser is not known (block 1042—No), the process goes to block 1025, described more fully below.

If the user has not been previously authenticated (block 1015—No), then at block 1020, the content manager requests and receives a mobile phone number to which confirmation codes can be sent. The mobile phone number received for the user is associated with the user's name and account and stored in a database. Then at block 1025, the content manager sends a confirmation to the user's mobile phone number, for example, as a text message.

Next, at decision block 1030, the content manager determines whether a confirmation code entered by the user correctly matches the sent confirmation code. If the confirmation code is correct (block 1030—Yes), at block 1040, the content manager sends a verification message to the user, and the user is permitted to access the user's account at block 1045. Further, the browser used by the user to access the account is stored in the authentication database for future use in determining whether a confirmation code needs to be sent to the user for two-step verification. If the confirmation code is not correct (block 1030—No), then at block 1035, the content manager requests that the user re-check the received confirmation code and try again. The process returns to decision block 1030.

Returning to FIG. 3A, some embodiments of the content manager 111 include the event manager 360 which can retrieve information on events, such as group and user events, access management activity, and content-related events for an enterprise account in the cloud-based platform. FIG. 3B depicts a block diagram illustrating an example of components in the event manager of a cloud-based platform (e.g., cloud-based collaboration and/or storage platform/ service). The event manager 360 can include a group and user event module 362, an access management activity module 363, a content-related event module 364, analysis engine 365, an alert module 366, and/or an activity log database 367. As shown in FIG. 3B, the activity log database 367 is part of the event manager 360. However, in some embodiments, the activity log database 367 can be external to the event manager 360.

The group and user event module 362 can receive a request from an administrator within the cloud-based platform or from an external business intelligence platform 115 via the API engine 390 to retrieve information on group and user events. Examples of group and user events include creation, deletion, edits, access changes, and failed logins. The group and user event module 362 can store retrieved information on group and user events in the activity log database 367. The group and user event module 362 can also send the retrieved information to a requesting business intelligence platform 115 via the API engine 390.

The access management activity module 363 can receive a request from an administrator within the cloud-based platform or from an external business intelligence platform 115 via the API engine 390 to retrieve information on access management activity. Examples of access management activity include trusted device enrollment, terms of service accepts, and terms of service rejections. The access management activity module 363 can store retrieved information on access management activity in the activity log database 367. The access management activity module 363 can also send the retrieved information to a requesting business intelligence platform 115 via the API engine 390.

The content-related event module 364 can receive a request from an administrator within the cloud-based platform or from an external business intelligence platform 115 via the API engine 390 on content-related events. Examples of content-related events include copy, download, move, delete, share, and sync. The content-related event module 364 can store retrieved information on content-related events in the activity log database 367. The content-related event module 364 can also send the retrieved information to a requesting business intelligence platform 115 via the API engine 390.

Reports can be custom generated by an administrator or a business intelligence platform 115 via the API engine 390 on demand. Examples of types of reports that can be generated include usage logs, file statistics, user statistics, and security reports. Once a report has been generated, it can be exported by the requesting administrator or to the business intelligence platform 115 via the API engine 390. Third-party solution integration can provide analytics to deliver best practices, key performance indicators, and dashboards for content management to help clients of the cloud-based platform to measure critical content metrics, such as top performing content, security risks, adoption, and engagement. Further, the disclosed technology enables users to customize dashboards and reports to reflect critical business processes through ad-hoc analysis and data discovery and to set notification thresholds for key metrics.

FIG. 5 depicts a screenshot showing an example of a user interface for requesting a report on usage logs. A specific date range, group or groups, and set of actions to track, filter, and export the data can be selected for the report. Actions that can be tracked and filtered can include collaboration activities, such as accepted invite, changed user role, extend collaborator expiration, removed collaborator, invited collaborator, and collaboration expiration; file sharing actions, such as enabled shared link, extend shared link expiration, set shared link expiration, and disabled shared link; log in and security actions, such as add login app, admin login, added device association, terms of service agree, failed login, login, terms of service reject, removed login activity application, removed device association, disable login verification, and enable login verification; synchronization actions, such as synced folder, and un-synced folder; comment activities, such as created comment, edited comment, and deleted comment; file access and management activities, such as copied, deleted, download, edit, locked, moved, previewed, renamed, set file auto-delete, undelete, and unlocked; and user and group management actions, such as added to group, added secondary email, created new user, created new group, changed admin role, changed primary email, deleted group, deleted user, edited group, edited user, folder removed from group, granted folder access, removed from group, and removed secondary email.

FIG. 6 depicts a screenshot showing an example of a user interface for requesting a report on file statistics. Activity can be monitored based on a specific file and/or folder name, and searches can be based on last download or last upload or edited activity.

Figures 7, 8:
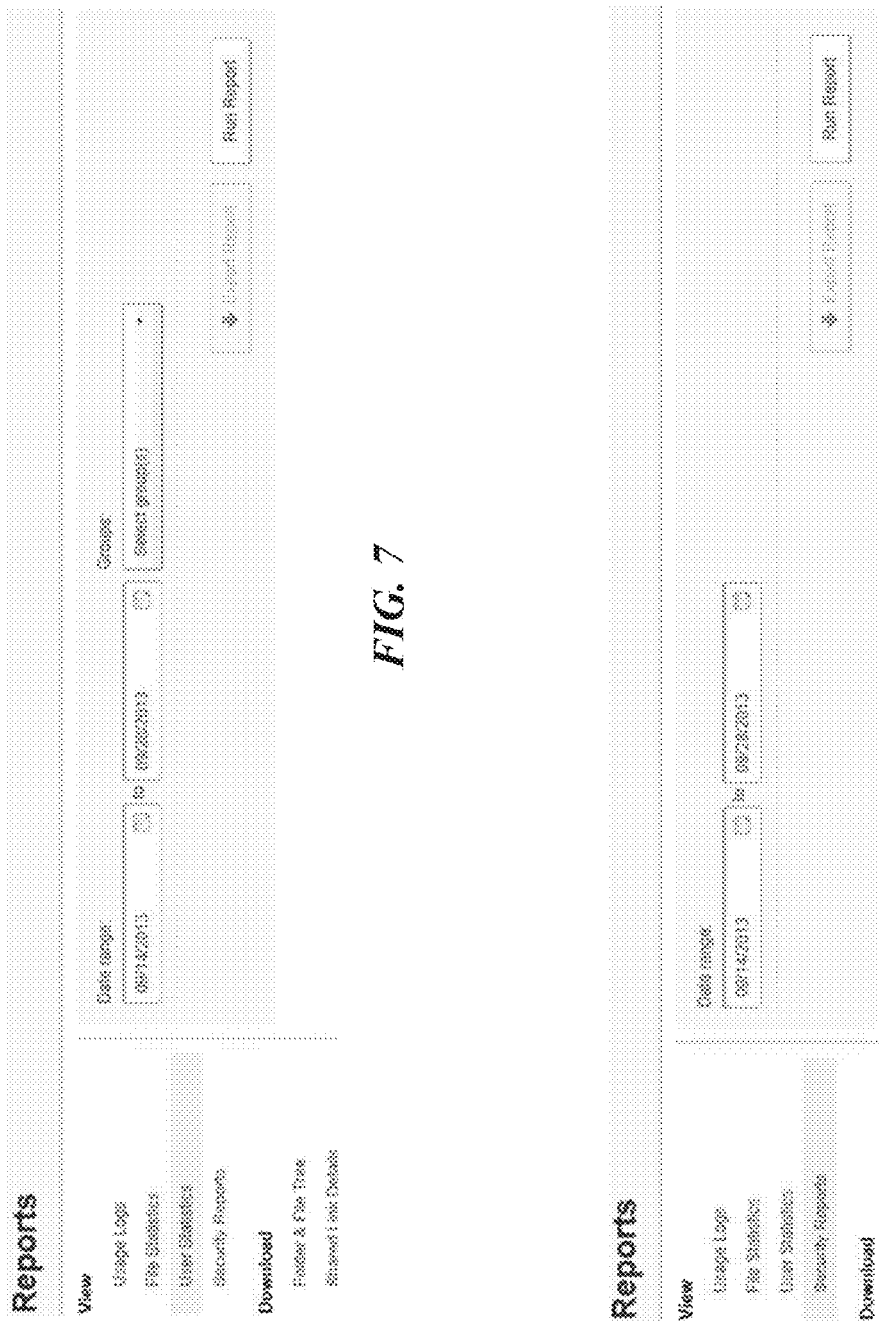
FIG. 7 depicts a screenshot showing an example of a user interface for an administrator of an enterprise requesting a report on user statistics.
FIG. 8 depicts a screenshot showing an example of a user interface for an administrator of an enterprise requesting a report on security reports.

FIG. 7 depicts a screenshot showing an example of a user interface for requesting a report on user statistics. Information can be retrieved about the specific type of activity users have performed, such as logins, downloads, previews, uploads, deletions, edits, and failed logins.

FIG. 8 depicts a screenshot showing an example of a user interface for requesting security reports. Users who have modified any security settings and what they changed can be tracked and monitored. Security reports allow an administrator or controller to have visibility into settings use by member users and to ensure that security is at an appropriate level for the enterprise account.

The analysis engine 365 can access events stored in the activity log database 367 to identify specific events or trends, such as unusual shifts in usage of the content stored within the cloud-based platform, spikes in traffic on the cloud-based platform, or abnormal behavior. Examples of abnormal behavior can be the downloading of several hundred files at once by a user. Once the analysis engine 365 identifies one of the events or trends, the administrator of the account within which the unusual activity is occurring can be alerted in real time by the alert module 366 so that appropriate action can be taken. Alternatively or additionally, the business intelligence platforms 115 can access the activity log database 367 to monitor events occurring in a specific enterprise account based on custom rules.

Some embodiments of the content manager 111 include the API engine 390 which supports an API that has specific functions to permit administrators or controllers to extract log data from the cloud-based platform or to scan uploaded files. For example, the API engine 390 permits third-parties to run and export reports pertaining to activity that occurs within an enterprise account of the cloud-based platform, to access the activity log database 367 in real-time to monitor events, and to scan files as they are uploaded to the cloud-based platform.

Figure 12A:
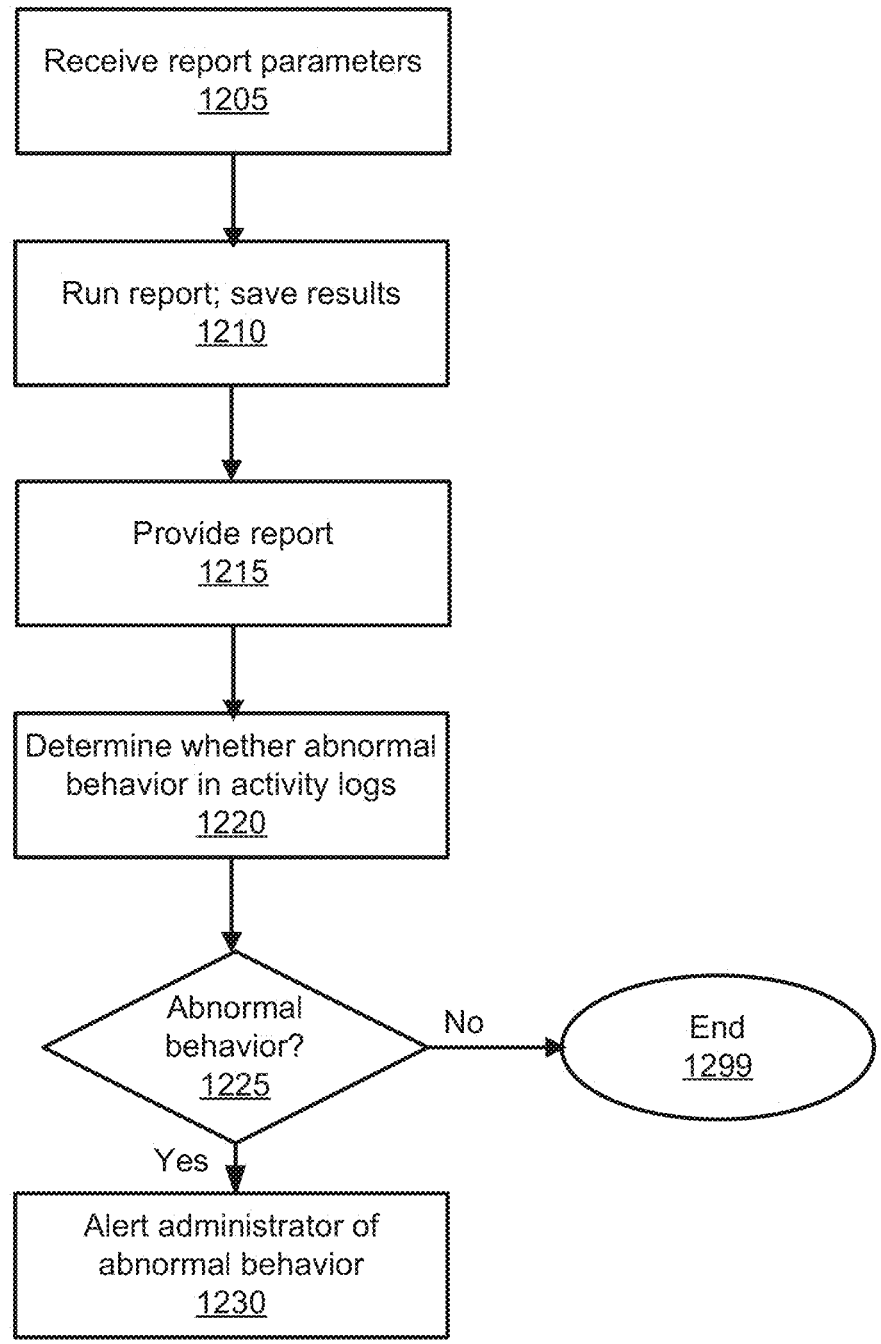
FIG. 12A depicts a flow chart illustrating an example process of implementing reporting API in a cloud-based platform (e.g., cloud-based collaboration and/or storage platform/service).

FIG. 12A depicts a flow chart illustrating an example process of requesting reports by an administrator in a cloud-based platform (e.g., cloud-based collaboration and/or storage platform/service).

At block 1205, the content manager receives report parameters from an administrator. Then at block 1210, the content manager runs the report and saves the results in an activity log database. At block 1215, the content manager provides the report to the requesting administrator.

Next, at block 1220, the content manager determines whether there is any abnormal behavior in the activity logs. Abnormal behavior can be defined beforehand by the administrator and any member user working with the administrator.

At decision block 1225, if abnormal behavior is detected (block 1225—Yes), then at block 1230, the content manager alerts the administrator of abnormal behavior.

If abnormal behavior is not detected (block 1225—No), the process ends at block 1299.

Figure 12B:
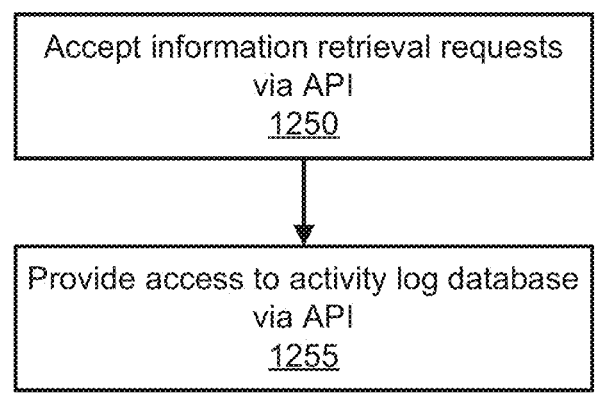
FIG. 12B depicts a flow chart illustrating an example process of requesting information from a cloud-based platform (e.g., cloud-based collaboration and/or storage platform/service) via an API.

FIG. 12B depicts a flow chart illustrating an example process of requesting information from a cloud-based platform (e.g., cloud-based collaboration and/or storage platform/service) via an API.

At block 1250, the content manager accepts information retrieval requests from a third-party via API. Then at block 1255, the content manager provides access to the activity log database via API Returning to FIG. 3A, some embodiments of the content manager 111 include the data loss prevention engine 370 which can identify restricted content that is uploaded to the cloud-based platform. FIG. 3C depicts a block diagram illustrating an example of components in the data loss prevention engine 370 of a cloud-based platform (e.g., cloud-based collaboration and/or storage platform/service). The data loss prevention engine 370 includes a file scanning module 372, a quarantine module 374, and/or a notification module 376.

The file scanning module 372 can scan files as they are uploaded to the cloud-based platform to identify sensitive or restricted content, such as credit card numbers, social security card numbers, and bank routing numbers.

Once a file containing sensitive content has been identified by the file scanning module 372, the quarantine module 374 removes the file from shared folders and stores the file in a quarantined or restricted area within the cloud-based platform to protect against the loss of confidential information. The restricted area can only be accessed by the administrator of the enterprise account to which the file was uploaded. In some embodiments, the quarantine module 374 can replace the original file location where the file was uploaded to within the cloud-based platform with a placeholder file. The placeholder file can inform a user who is trying to access the restricted file to seek permission from the administrator for access privileges.

If a file with sensitive information is identified by the file scanning module 372, the notification module 376 can notify the administrator of the enterprise account to which the user attempted to upload the file. The administrator can perform an action, such as releasing the document from quarantine with no restrictions, releasing the document form quarantine but prevent sharing of the document, or another customizable option.

In some instances, a third-party developer 116, such as a data loss prevention provider's security as a service, can implement the process for identifying files containing restricted information that are uploaded to the cloud-based platform, rather than the data loss prevention engine 370. Then rules for identifying restricted data can be customized by the third-party developer. For example, compliance templates for payment cards industry (PCI) or health insurance portability and accountability act (HIPPA) can be implemented. In these instances, the data loss prevention engine 370 can provide access via the API engine 390 to uploaded files to the third-party developer or provider 116 for identification of restricted content.

Figure 13:
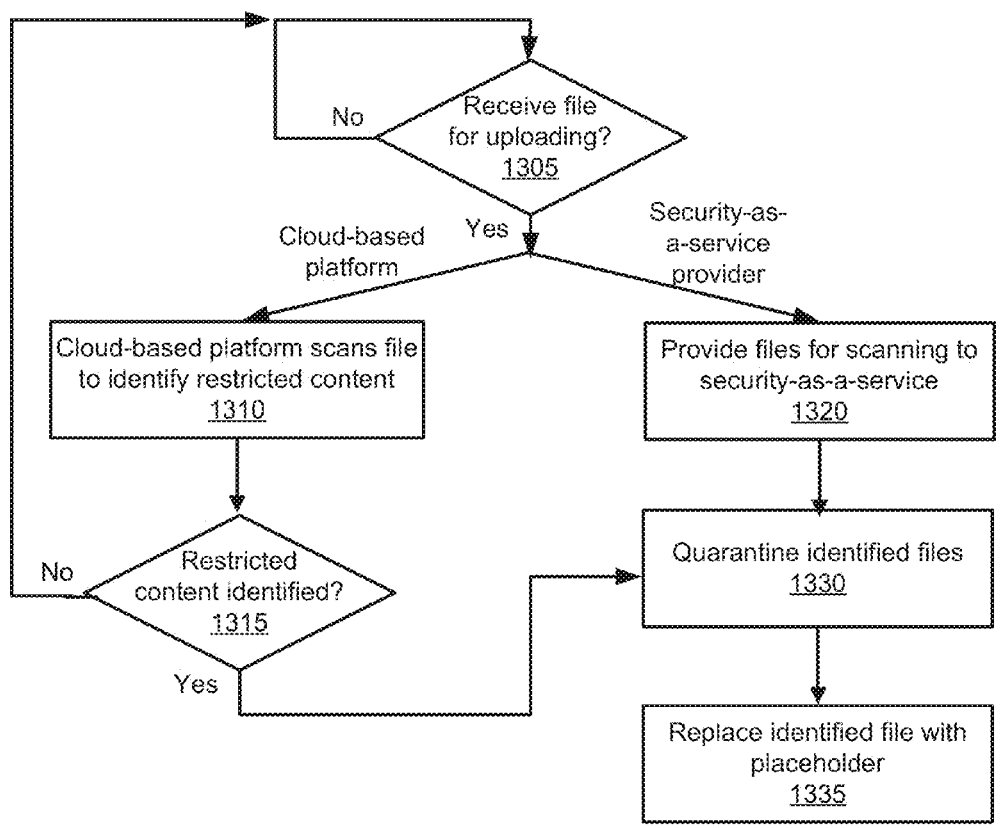
FIG. 13 depicts a flow chart illustrating an example process of implementing data loss prevention in a cloud-based platform (e.g., cloud-based collaboration and/or storage platform/service).

FIG. 13 depicts a flow chart illustrating an example process of implementing data loss prevention in a cloud-based platform (e.g., cloud-based collaboration and/or storage platform/service).

At decision block 1305, the content manager determines whether a file has been received for uploading to the cloud-based platform. If no file has been received for uploading (block 1305—No), the process remains at decision block 1305. If a file is received for uploading (block 1305—Yes), then are two paths that the process can take. If the cloud-based platform performs the data loss prevention (block 1305—Yes—cloud-based platform), then at block 1310, the content manager of the cloud-based platform scans the uploaded file to identify whether it contains any restricted or sensitive content. Then at decision block 1315, the content manager determines whether any restricted content has been identified. If no restricted content is detected (block 1315—No), the process returns to decision block 1305.

If restricted content is detected (block 1315—Yes), at block 1330, the content manager quarantines the file by placing it in a restricted area that only the administrator of the enterprise account to which the file was uploaded can access the file. Then at block 1335, the content manager replaces the identified file that has restricted content with a placeholder file.

If a security-as-a-service provider is performing the data loss prevention (block 1305—Yes—security-as-a-service provider), then at block 1320, the content manager provides the uploaded files to the security-as-a-service for scanning, for example, via an API. The security-as-a-service can apply customized rules that identify which files contain restricted content. The process continues to block 1330 where the content manager of the cloud-based platform quarantines any files identified by the security-as-a-service provider to contain restricted content. And at block 1335, the content manager replaces the identified file with a placeholder file.

Figure 14:
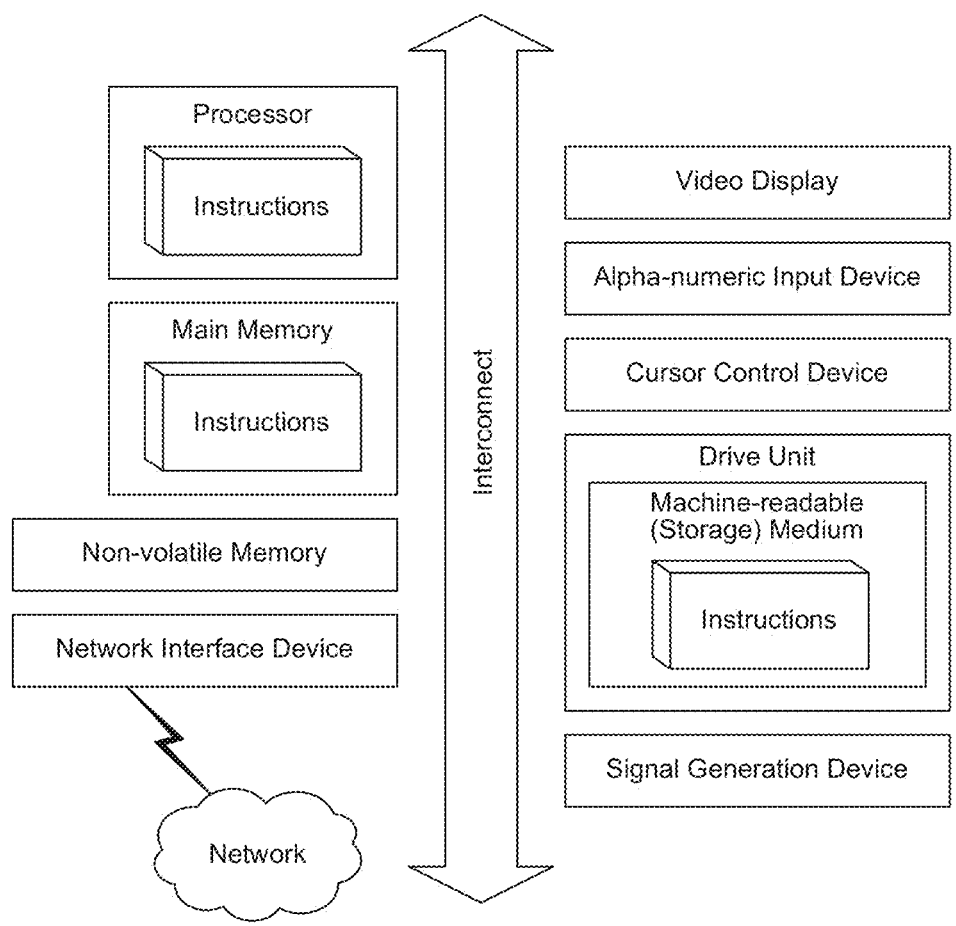
FIG. 14 shows a diagrammatic representation of a machine in the example form of a computer system within which a set of instructions, for causing the machine to perform any one or more of the methodologies discussed herein, may be executed.

FIG. 14 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in

What is claimed is:

1. A method comprising:
receiving a file to a location in a content repository of a cloud-based environment, wherein the content repository stores data for multiple users associated with an enterprise account;
permitting a third-party to access an activity log database in real-time to monitor events and permitting the third-party to scan the file as it is being uploaded to the content repository in the cloud-based environment, said each permitting via an application programming interface (API) of the cloud-based environment, wherein the third-party request identifies a security-as-a-service provider external to the content repository;
permitting the security-as-a-service provider access to the file in the content repository for scanning the file via the API, wherein the API provides rules customized by the security-as-a-service provider for identifying files containing sensitive information; and
receiving an indication from the third-party whether the file contains sensitive information.

2. The method of claim 1, further comprising:
moving the file to a restricted area based at least in part on the indication from the third-party, wherein the file is not accessible for sharing by the multiple users in the restricted area.

3. The method of claim 2, further comprising:
inserting a placeholder file at the location in the content repository based at least in part on the indication from the third-party.

4. The method of claim 1, further comprising:
permitting an administrator of the enterprise to request information on activities occurring in the content repository.

5. The method of claim 1, wherein users not associated with the enterprise store or modify data stored in the content repository in collaboration with the multiple users associated with the enterprise.

6. The method of claim 1, further comprising:
analyzing the requested information for unusual changes in usage of the content repository or abnormal behavior occurring within the content repository.

7. The method of claim 1, further comprising:
sending an alert to the administrator in real-time upon determining an unusual change in usage of the content repository or abnormal behavior occurring within the content repository.

8. The method of claim 1, further comprising:
permitting the third-party to request custom information on activities occurring in the content repository via an application programming interface (API).

9. The method of claim 1, wherein activities in the activity log database include group and user events.

10. The method of claim 1, wherein activities in the activity log database include access management activity or content related events.

11. A non-transitory machine-readable storage medium having stored thereon instructions which, when executed by a processor, causes the processor to:
receive a file to a location in a content repository of a cloud-based environment, wherein the content repository stores data for multiple users associated with an enterprise account;

permit a third-party to access an activity log database in real-time to monitor events and permit the third-party to scan the file as it is being uploaded to the content repository in the cloud-based environment, said each permitting via an application programming interface (API) of the cloud-based environment, wherein the third-party request identifies a security-as-a-service provider external to the content repository;

permit the security-as-a-service provider access to the file in the content repository for scanning the file via the API, wherein the API provides rules customized by the security-as-a-service provider for identifying files containing sensitive information; and receive an indication from the third-party whether the file contains sensitive information.

12. The non-transitory machine-readable storage medium of claim 11 which, when executed by a processor, further causes the processor to move the file to a restricted area based at least in part on the indication from the third-party, wherein the file is not accessible for sharing by the multiple users in the restricted area.

13. The non-transitory machine-readable storage medium of claim 11 which, when executed by a processor, further causes the processor to insert a placeholder file at the location in the content repository based at least in part on the indication from the third-party.

14. The non-transitory machine-readable storage medium of claim 11 which, when executed by a processor, further causes the processor to permit an administrator of the enterprise to request information on activities occurring in the content repository.

15. The non-transitory machine-readable storage medium of claim 11 which, when executed by a processor, further causes the processor to allow users not associated with the enterprise to store or modify data stored in the content repository in collaboration with the multiple users associated with the enterprise.

16. The non-transitory machine-readable storage medium of claim 11 which, when executed by a processor, further causes the processor to analyze the requested information for unusual changes in usage of the content repository or abnormal behavior occurring within the content repository.

17. The non-transitory machine-readable storage medium of claim 11 which, when executed by a processor, further causes the processor to send an alert to the administrator in real-time upon determining an unusual change in usage of the content repository or abnormal behavior occurring within the content repository.

18. The non-transitory machine-readable storage medium of claim 11 which, when executed by a processor, further causes the processor to permit the third-party to request custom information on activities occurring in the content repository via an application programming interface (API).

19. The non-transitory machine-readable storage medium of claim 11, wherein activities in the activity log database include group and user events.

20. The non-transitory machine-readable storage medium of claim 11, wherein activities in the activity log database include access management activity or content related events.

21. A system comprising:
a processor;
a memory having stored thereon instructions which, when executed by the processor, cause the system to:
receive a file to a location in a content repository of a cloud-based environment, wherein the content repository stores data for multiple users associated with an enterprise account;
permit a third-party to access an activity log database in real-time to monitor events and permit the third-party to scan the file as it is being uploaded to the content repository in the cloud-based environment, said each permitting via an application programming interface (API) of the cloud-based environment, wherein the third-party request identifies a security-as-a-service provider external to the content repository;
permit the security-as-a-service provider access to the file in the content repository for scanning the file via the API, wherein the API provides rules customized by the security-as-a-service provider for identifying files containing sensitive information; and
receive an indication from the third-party whether the file contains sensitive information.

22. The system of claim 21, wherein the stored instructions, when executed by the processor, further cause permitting an administrator of the enterprise to request information on activities occurring in the content repository.

23. The system of claim 21, wherein the stored instructions, when executed by the processor, further cause allowing users not associated with the enterprise to store or modify data stored in the content repository in collaboration with the multiple users associated with the enterprise.

24. The system of claim 21, wherein the stored instructions, when executed by the processor, further cause analyzing the requested information for unusual changes in usage of the content repository or abnormal behavior occurring within the content repository.

25. The system of claim 21, wherein the stored instructions, when executed by the processor, further cause sending an alert to the administrator in real-time upon determining an unusual change in usage of the content repository or abnormal behavior occurring within the content repository.

26. The system of claim 21, wherein the stored instructions, when executed by the processor, further cause permitting the third-party to request custom information on activities occurring in the content repository via an application programming interface (API).

27. The system of claim 21, wherein activities in the activity log database include group and user events.

28. The system of claim 21, wherein activities in the activity log database include access management activity or content related events.

* * * * *